(12) United States Patent
Powers et al.

(10) Patent No.: US 6,964,207 B2
(45) Date of Patent: Nov. 15, 2005

(54) DEFLECTION MEASUREMENT DEVICE FOR FLEXIBLE PIPING

(75) Inventors: Rodney G. Powers, Gainesville, FL (US); Robert M. Langley, Hawthorne, FL (US)

(73) Assignee: The State of Florida, Department of Transportation, Tallahassee, FL (US)

( * ) Notice: Subject to any disclaimer, the term of this patent is extended or adjusted under 35 U.S.C. 154(b) by 0 days.

(21) Appl. No.: 10/811,744

(22) Filed: Mar. 29, 2004

(65) Prior Publication Data

US 2004/0177708 A1 Sep. 16, 2004

Related U.S. Application Data

(63) Continuation of application No. 10/021,790, filed on Dec. 19, 2001, now abandoned.

(51) Int. Cl.[7] ............................................... G01B 5/12
(52) U.S. Cl. ...................................................... 73/865.8
(58) Field of Search ........................... 73/865.8, 866.5; 33/544, 544.1, 544.2, 544.3, 544.5

(56) References Cited

U.S. PATENT DOCUMENTS 4,085,510 A  4/1978  Kirschke ................... 33/544.3

Primary Examiner—Robert Raevis
(74) Attorney, Agent, or Firm—J. Wiley Horton

(57) ABSTRACT

A mechanical inspection sled which can be pushed through a pipeline using a series of connecting rigid rods. Mechanical measuring devices are mounted on the sled. These devices deflect when the pipe's internal diameter decreases. The deflection is visually observable by the user through a series of reflective indicators. The measuring devices are sufficiently pliable to allow the sled to pass beyond distorted areas and complete a full inspection of the pipeline. The measurement devices are adjustable to allow the sled to be used in many different pipe sizes. Because the device is purely mechanical, it is quite rugged and able to withstand harsh environments.

6 Claims, 29 Drawing Sheets

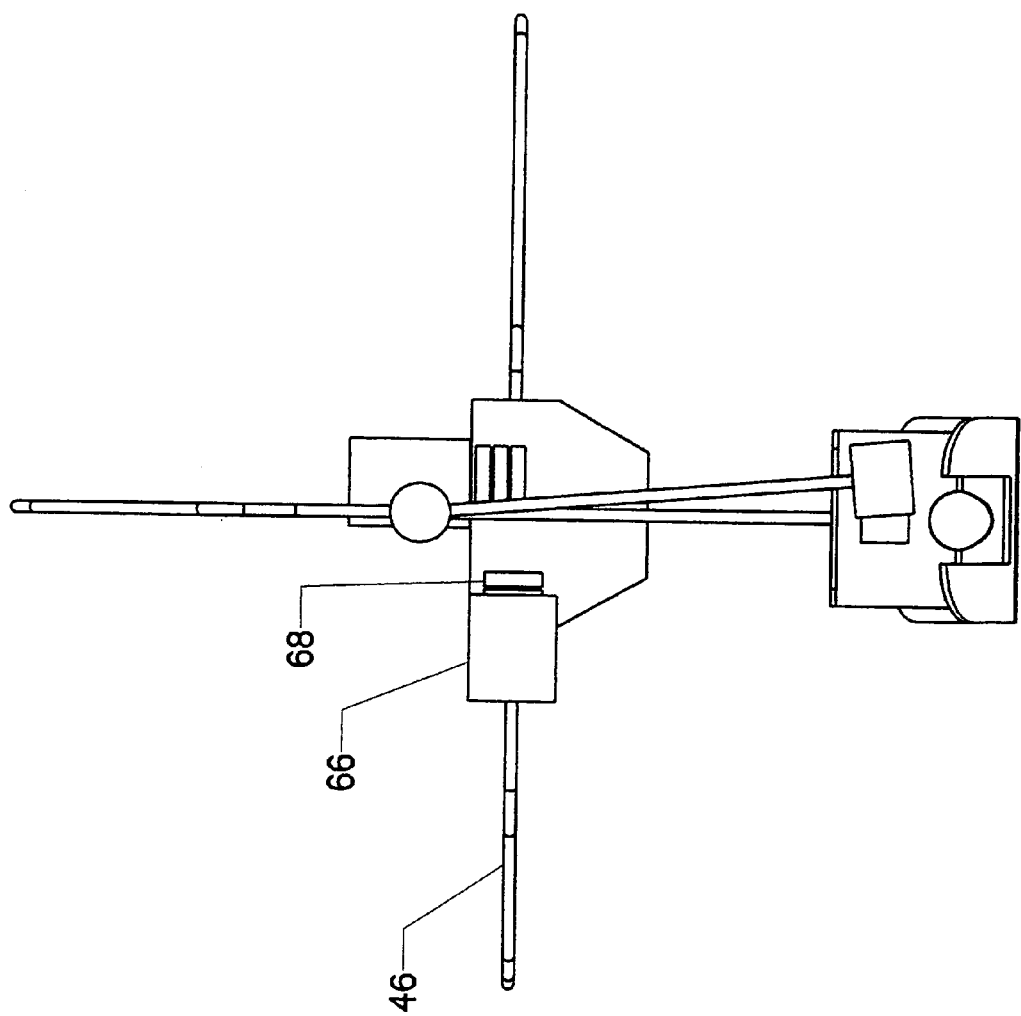

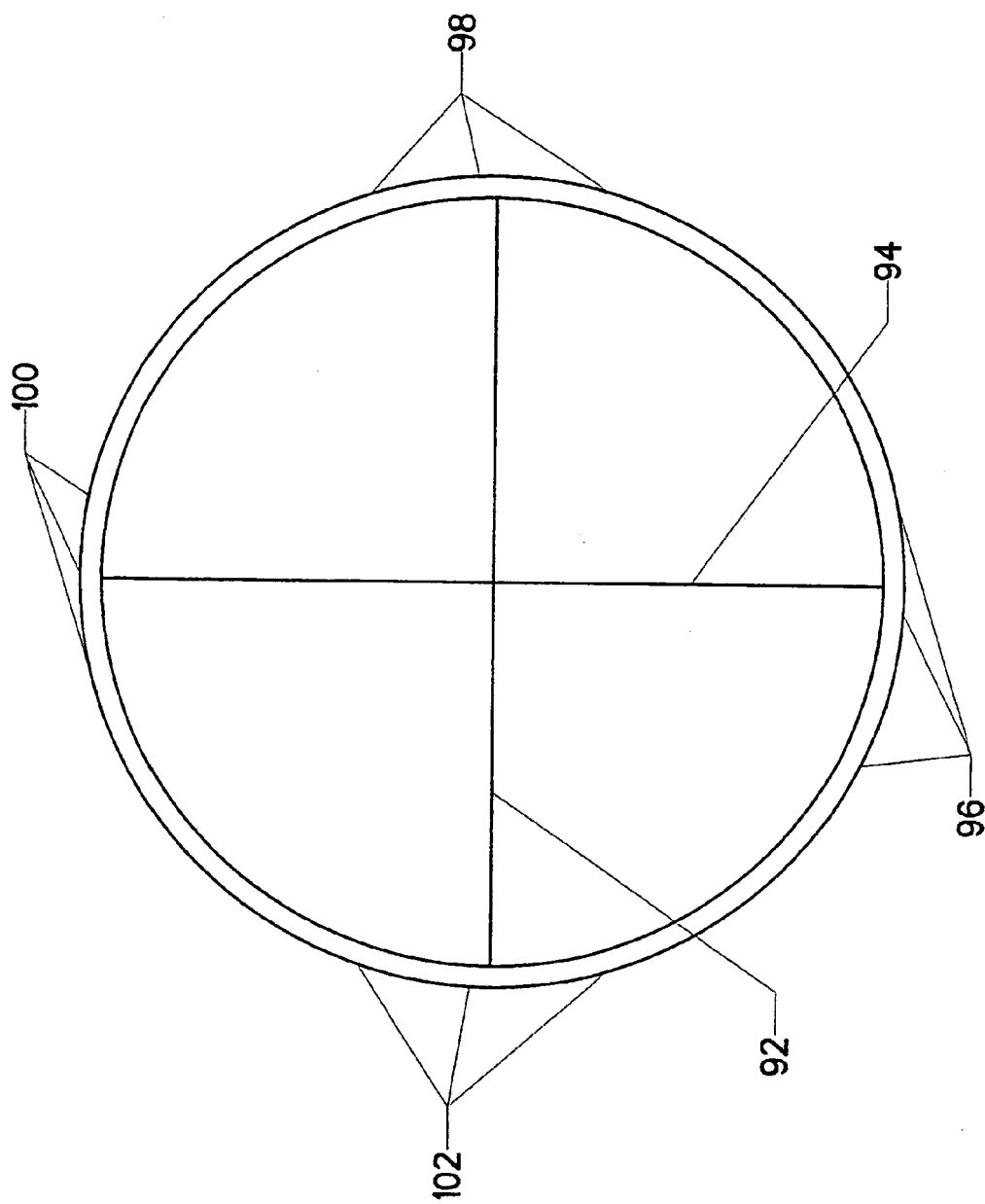

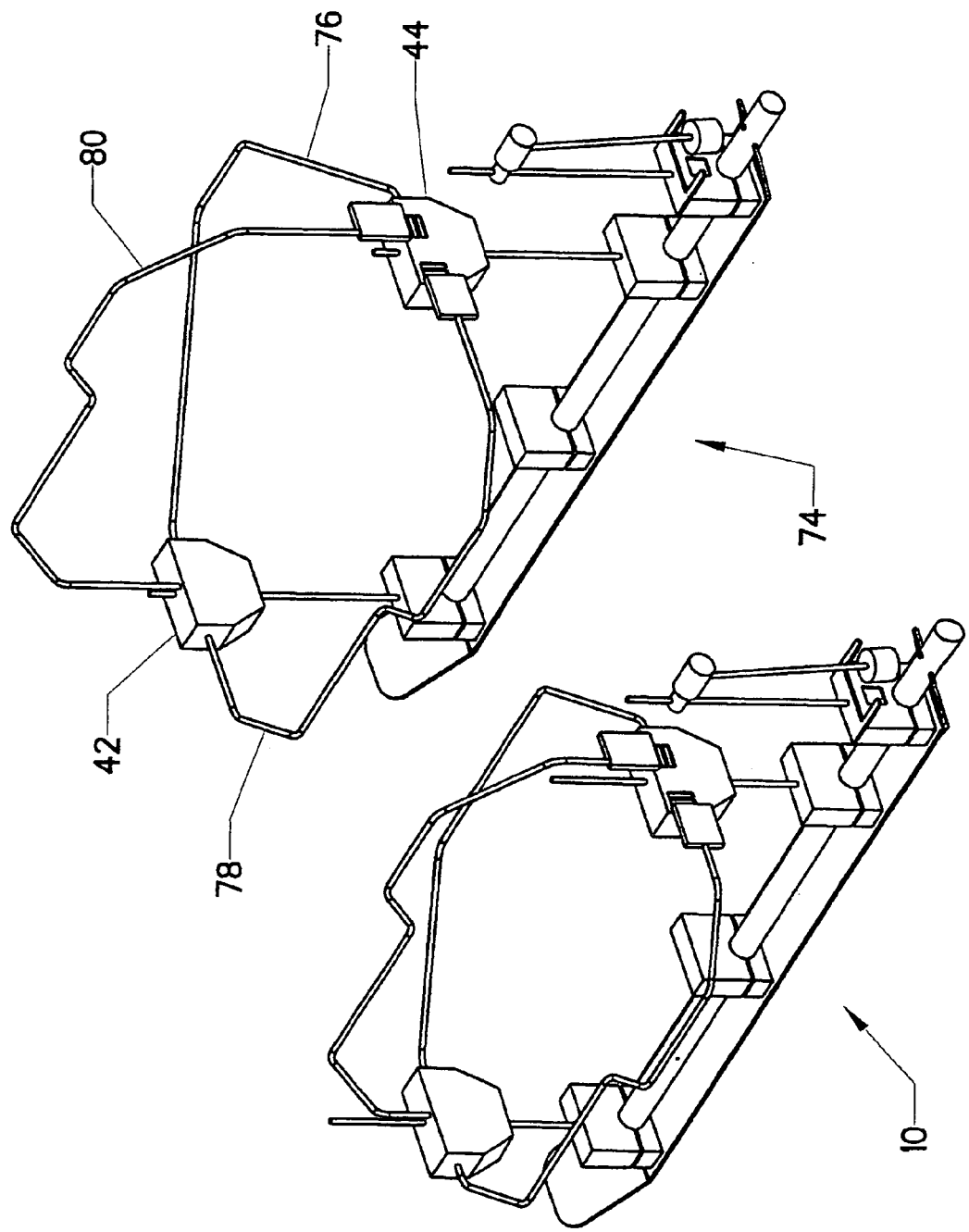

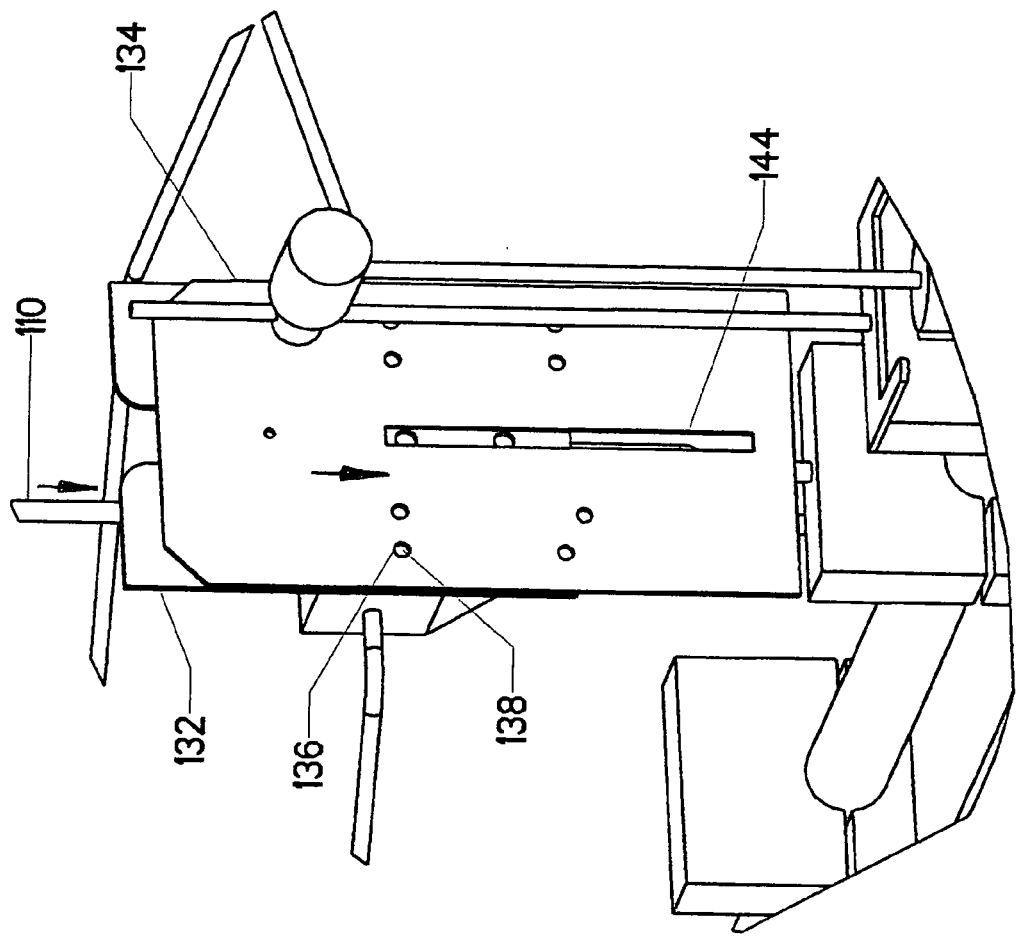

DEFLECTION MEASUREMENT DEVICE FOR FLEXIBLE PIPING

CROSS-REFERENCES TO RELATED APPLICATIONS

This application is a CONTINUATION of U.S. application Ser. No. 10/021,790, filed on Dec. 19, 2001. The Applicants hereby expressly claim the benefit of the earlier application under 35 U.S.C. §120 and 37 CFR §1.53(b). The parent application Ser. No. (10/021,790) is now abandoned.

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of piping inspection. More specifically, the invention comprises an adjustable sled which detects and measures vertical and horizontal deflection in the interior diameter of a flexible pipe as it is advanced through the pipe. The device transmits its deflection measurements to the user by simple visual means, eliminating the need for electronic devices.

2. Description of the Related Art

Piping is commonly used as a means to convey drainage water and other liquids. Buried pipe has traditionally been made of concrete. Concrete's widespread use is attributable to the fact that it is readily available, durable, and quite strong. Concrete piping may be buried deep within the soil without concern for structural failure. Recently, however, more flexible piping has come into widespread use. Flexible piping is often made from thin-gage metals, or polymers such as polyvinyl chloride and polyethylene. Such flexible piping is subject to circumferential deflection when exposed to soil loading.

Proper installation and soil compacting is critical for flexible piping. If the soil surrounding the flexible piping is correctly compacted in layers, a "soil arch" develops over the top of the piping which prevents excessive deflection. If, however, the soil is added around the piping without properly compacting it layer by layer, then the deflection may become excessive. While one would intuitively expect vertical deflection, horizontal deflection also occurs. Excessive deflection can lead to localized or generalized failure of the pipe wall, resulting in a catastrophic leak.

These concerns are heightened when the flexible piping is made of a polymer, since distorting loads tend to produce buckling and cracking in such polymers. Although the cracks may start small, they tend to propagate through the polymer—eventually weakening it to the point of failure. The distorting forces can also produce failures in the joints between two sections of pipe, which must carry the load when one pipe shifts relative to its neighbor.

It is possible to visually monitor the soil compaction process and ensure that it is carried out correctly. However, it is difficult or impossible to determine if the soil compaction has resulted in excessive pipe deflection after the fact. Examination of these deflections is often used as the criterion to determine the acceptability of flexible piping installations. Accordingly, a device for easily measuring such deflections would be useful.

The prior art approach to measuring the deflections has generally been to create a mandrel having an outside diameter equal to the minimum acceptable inside diameter of the piping. A cable is passed through the piping and this cable is used to drag the test mandrel back through. The shortcomings of this approach are as follows:

1. A new mandrel must be made for each pipe size that is to be inspected;

2. A cable must be passed completely through the piping before the mandrel is introduced—often a difficult process in itself;

3. An additional cable must be attached to the trailing end of the mandrel to pull it free if it gets stuck;

4. The mandrel can be lodged by debris in the piping, giving a false impression of excessive deflection; and 5. Once the mandrel reaches a point of excessive deflection it can proceed no further, meaning that the remainder of the piping system cannot be inspected.

Other more sophisticated approaches are found in the prior art. As an example, U.S. Pat. No. 6,170,344 to Ignagni (2001) reveals an inspection "pig" equipped with an inertial measurement system (presumably gyroscopes and accelerometers). Another approach employs projected laser beams and video cameras, along with computers running software which can translate the laser projections into distance measurements on the inner wall of the pipeline.

The reader should appreciate that buried piping which is used to convey drainage water—as opposed to oil or natural gas piping—is often filled with water puddles and other contamination. The use of electronic devices is therefore difficult, owing to the rugged nature of the application. An electronics-intensive approach is also inherently expensive. All these limitations are significant.

BRIEF SUMMARY OF THE INVENTION

The present invention is a mechanical inspection sled which can be pushed through a pipeline using a series of connecting rigid rods. Mechanical measuring devices are mounted on the sled. These devices deflect when the pipe's internal diameter decreases. The deflection is visually observable by the user through a series of reflective indicators. The measuring devices are sufficiently pliable to allow the sled to pass beyond distorted areas and complete a full inspection of the pipeline.

The measurement devices are adjustable to allow the sled to be used in many different pipe sizes. Because the device is purely mechanical, it is quite rugged and able to withstand harsh environments. In addition, very little training is required to use the device.

BRIEF DESCRIPTION OF THE SEVERAL VIEWS OF THE DRAWINGS

FIG. 5C is an elevation view, showing the operation of the lateral visual indicators.

FIG. 7B is a perspective view, illustrating the horizontal and vertical diameters of a pipe.

FIG. 8 is an isometric view, showing how the inspection sled can be adjusted to inspect larger pipes.

FIG. 18 is a detail view, illustrating the operation of the visual indicator system.

Figure 1:
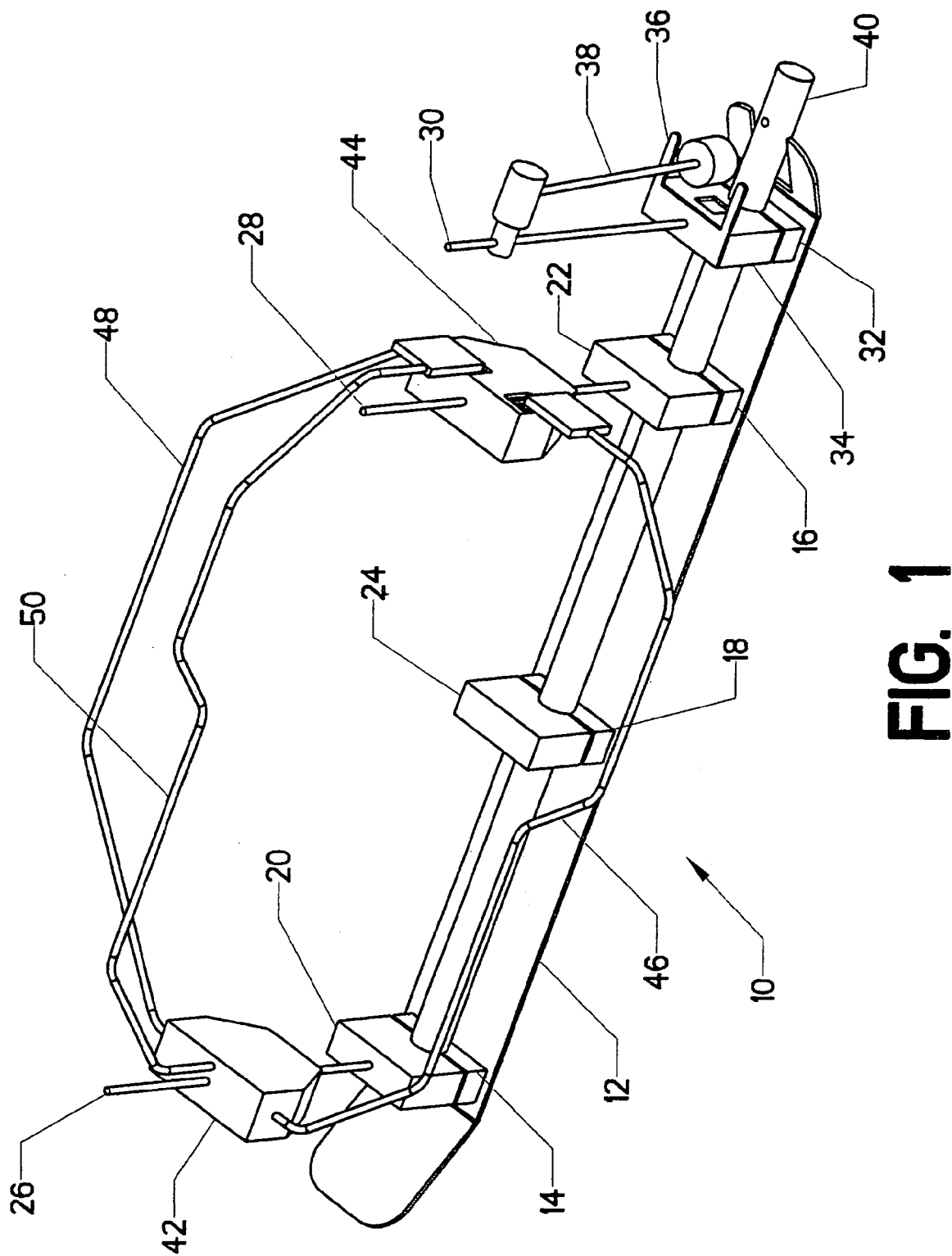
FIG. 1 is an isometric view, showing the inspection sled.

REFERENCE NUMERALS IN THE DRAWINGS 10 inspection sled 12 runner
14 front tube boss 16 rear tube boss
18 middle tube boss 20 front tube clamp
22 rear tube clamp 24 middle tube clamp
26 forward mast 28 rear mast
30 plumb mast 32 plumb boss
34 plumb clamp 36 plumb bracket
38 plumb 40 pipe
42 forward bracket 44 rear bracket
46 lateral test arm 48 lateral fixed arm
50 vertical test arm 52 plumb pivot
54 plumb weight 56 plumb reflector
58 18"-diameter pipe 60 extension rod
62 rod receiver 64 rod coupler
66 lateral flag 68 lateral indicator
70 vertical flag 72 vertical indicator
74 24" inspection sled 76 24" lateral fixed arm
78 24" lateral test arm 80 24" vertical test arm
82 24"-diameter pipe 84 gage
86 vertical zero 88 horizontal zero
90 calibration steps 92 horizontal diameter
94 vertical diameter 96 bottom region
98 first side region 100 top region
102 second side region 104 vertical deflection bar
106 forward spring bracket 108 rear spring bracket
110 guide rod 112 guide rod hole
114 compression spring 116 stop collar
118 point reflector 120 flex mast
122 contact point 124 tube
126 tube mount 128 orifice
130 reflector 132 reflector card
134 window card 136 first window
138 first reflector 140 second reflector
142 card mount 144 guide slot
146 second window 148 third window
150 fourth window 152 fifth window
154 sixth window 156 seventh window
158 eighth window 160 third reflector
162 fourth reflector 164 fifth reflector
166 sixth reflector 168 seventh reflector
170 eighth reflector 174 ninth reflector
176 tenth reflector 178 eleventh reflector
180 twelfth reflector

DESCRIPTION OF THE INVENTION

The principal objective of the present invention is to measure deformations in the horizontal and vertical diameters of a pipe. The "horizontal diameter" is defined as a measurement of the pipe's internal diameter taken through its centerline in a direction which is parallel to the earth's surface. The "vertical diameter" is defined as a measurement of the pipe's internal diameter taken through its centerline in a direction which is perpendicular to the earth's surface FIG. 1 illustrates the major components of inspection sled 10. All the components are mounted on a base element, designated in the view as runner 12. Runner 12 is a ski-like structure, having upturned ends. It is intended to slide along the inside lower surface of a pipe. Although a wheeled carriage could be employed, runner 12 is simpler and has been found to be satisfactory.

Mounted directly to runner 12 are front tube boss 14, middle tube boss 18, rear tube boss 16, and plumb boss 32. In the embodiment shown, runner 12 is made from sheet aluminum. The bosses are machined from aluminum blocks. However, those skilled in the art will appreciate that the material selection is simply one of manufacturing expedience. As an example, runner 12 and the attached bosses could be manufactured as an integral piece of glass reinforced polymer—using the reaction injection molding method. As illustrated, the bosses are simply bolted to runner 12.

Each tube boss has a cylindrical cavity running transversely through it. Pipe 40 is laid into these cavities. Front tube clamp 20, middle tube clamp 24, rear tube clamp 22, and plumb clamp 34 are then placed over the top of pipe 40. These tube clamps also have transverse cylindrical cavities corresponding to those found in the tube bosses. The tube clamps are bolted to the tube bosses using conventional fasteners, with the result that pipe 40 is mechanically affixed to runner 12.

Forward mast 26 rises vertically from front tube clamp 20. Forward bracket 42 is mounted to forward mast 26 by conventional means. Forward bracket 42 is vertically adjustable, so that a user can move it up and down forward mast 26, locking it in place in a desired position. Rear mast 28 rises vertically from rear tube clamp 22. Rear bracket 44 is mounted to rear mast 28 in a vertically adjustable manner. The vertical height of forward bracket 42 and rear bracket 44 must be adjusted in unison, as will be explained subsequently.

Lateral fixed arm 48 is attached to forward bracket 42 and rear bracket 44. It is substantially rigid. It lies in a horizontal plane, which will ideally rest on the horizontal diameter 92 of a pipe being inspected. Opposite lateral fixed arm 48 is lateral test arm 46. The forward portion of lateral test arm 46 is fixed to forward bracket 42. The rear portion, however, is free to move. Lateral test arm 46 is made of a resilient and flexible material. Solid aluminum rod is a good choice, as it is able to bend in and out substantially without suffering a plastic deformation. As test sled 10 is advanced through a pipe and encounters a reduction in the horizontal diameter 92 of the pipe, lateral test arm 46 will deflect, with its rearward portion moving inward.

Vertical test harm 50 is the vertical counterpart to lateral test arm 46. Its forward portion is secured to forward mast 26, but its rear portion is free to move. If test sled 10 encounters a reduction in a pipe's vertical diameter 94, vertical test arm 50 will deflect, with its rearward portion moving downward.

It is important that inspection sled 10 remain level during its progress through a pipe. Otherwise, it will not be measuring the true horizontal 92 and vertical 94 diameters of the pipe. Plumb 38 is provided as a leveling aid. Plumb mast 30 rises vertically from plumb clamp 34. Plumb 38 is pivotally mounted to plumb mast 30. Plumb bracket 36 restricts the angular travel of plumb 38.

Figure 2:
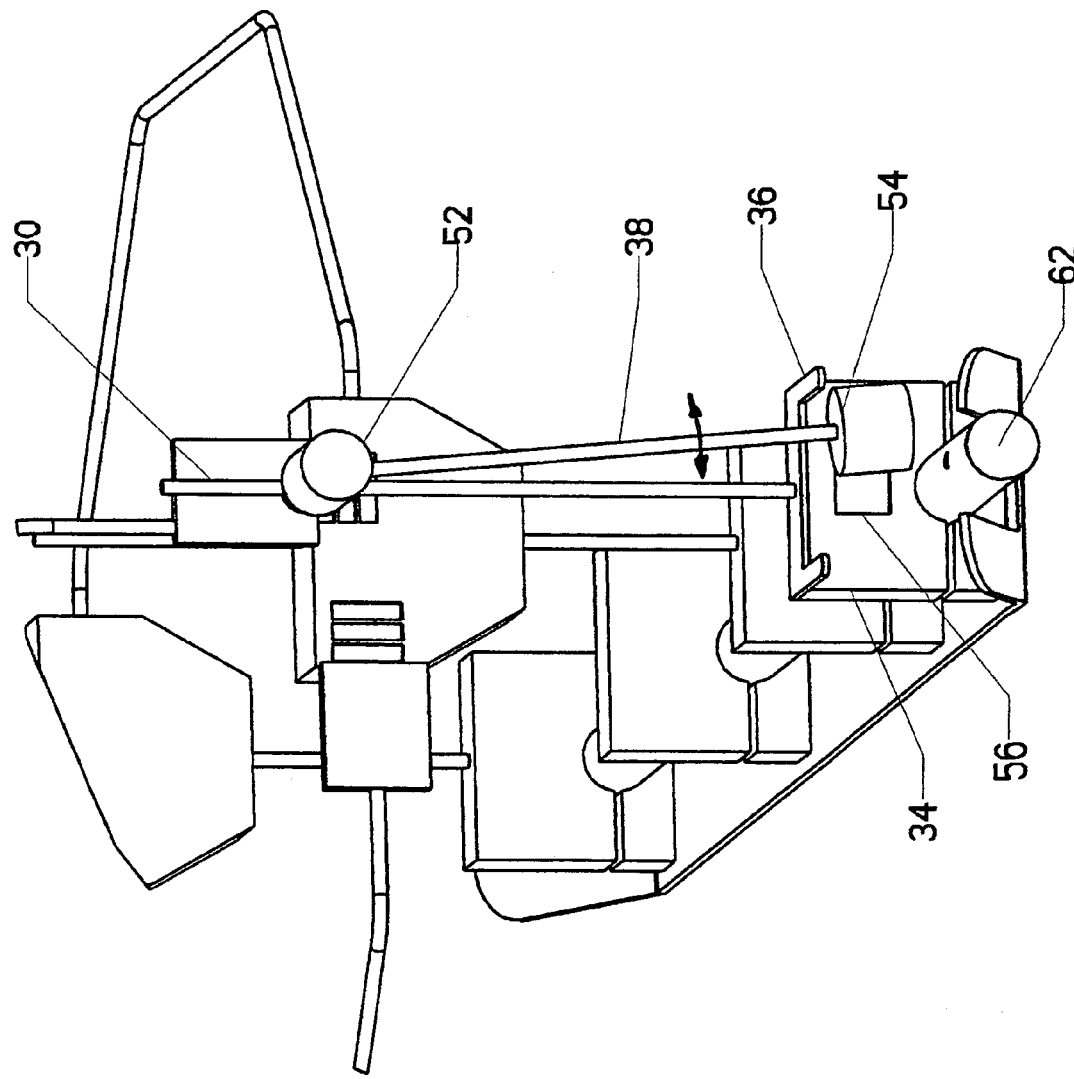
FIG. 2 is an isometric view, showing details of the rear portion of the sled.

FIG. 2—which is a partial view—shows the rear features of inspection sled 10 in more detail. Plumb 38 is attached to plumb mast 30 by plumb pivot 52. Plumb 38 is free to rotate as indicated by the arrows. Plumb weight 54 ensures that plumb 38 is oriented vertically when inspection sled 10 is level. In that state, plumb reflector 56 is completely obscured by plumb weight 54 (when the device is viewed from the rear).

The reader should appreciate that inspection sled 10 will be introduced into an open end of a pipe and advanced away from the user. The user will customarily shine a light into the pipe to observe the progress of the device. Provided that inspection sled 10 is level, the user will not see any reflection from plumb reflector 56. However, if inspection sled 10 rotates, plumb 38 will pivot and plumb reflector 56 will be exposed. This informs the user that the device is no longer level and should therefore be adjusted.

FIG. 2 also shows the hollow end of pipe 40, designated as rod receiver 62. The user customarily advances the device by sticking another length of pipe into rod receiver 62 and pushing the device forward. Rod receiver 62 is typically equipped with a transverse hole, into which a locking pin from the pushing rod will lock.

Figure 3:
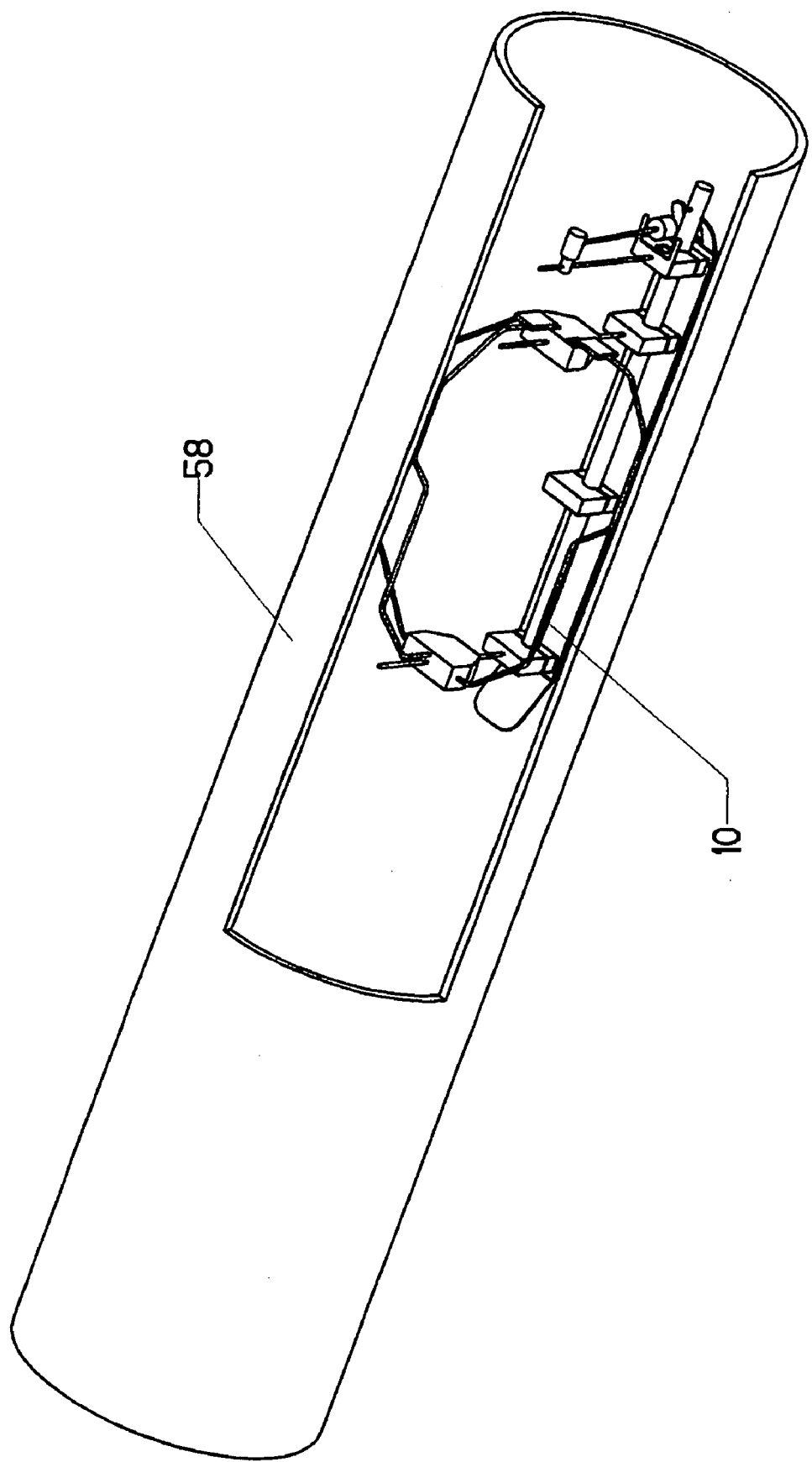
FIG. 3 is an isometric view with a cutaway, showing the inspection sled in a pipe.
Figure 4:
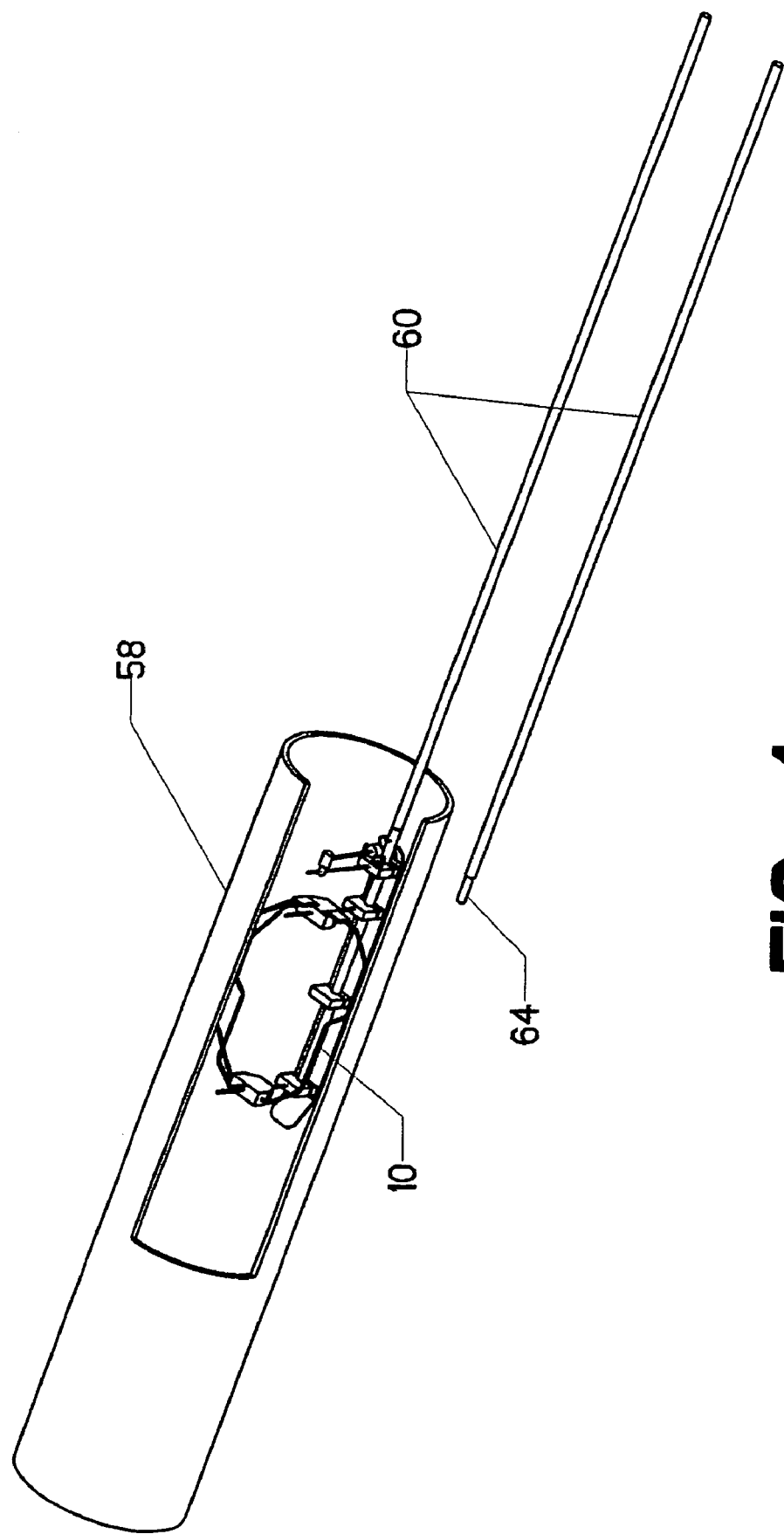
FIG. 4 is an isometric view with a cutaway, showing how the inspection sled is advanced through a pipe.

FIG. 3 shows inspection sled 10 placed within 18"-diameter pipe 58 (shown with a cutaway). FIG. 4 shows how inspection sled 10 is advanced. Extension rod 60 is placed into rod receiver 62 and the user pushes the device forward, as indicated by the arrow. A number of rigid extension rods 60 are used to advance the device. Each one contains rod coupler 64, which is a necked-down cylinder which fits within the hollow extension rod 60 before it. Extension rods 60 contain transverse locking pins which automatically lock successive rods together and prevent one from turning relative to its neighbor. Owing to these features, the user can push inspection sled 10 forward and rotate it to keep it level.

Figure 5:
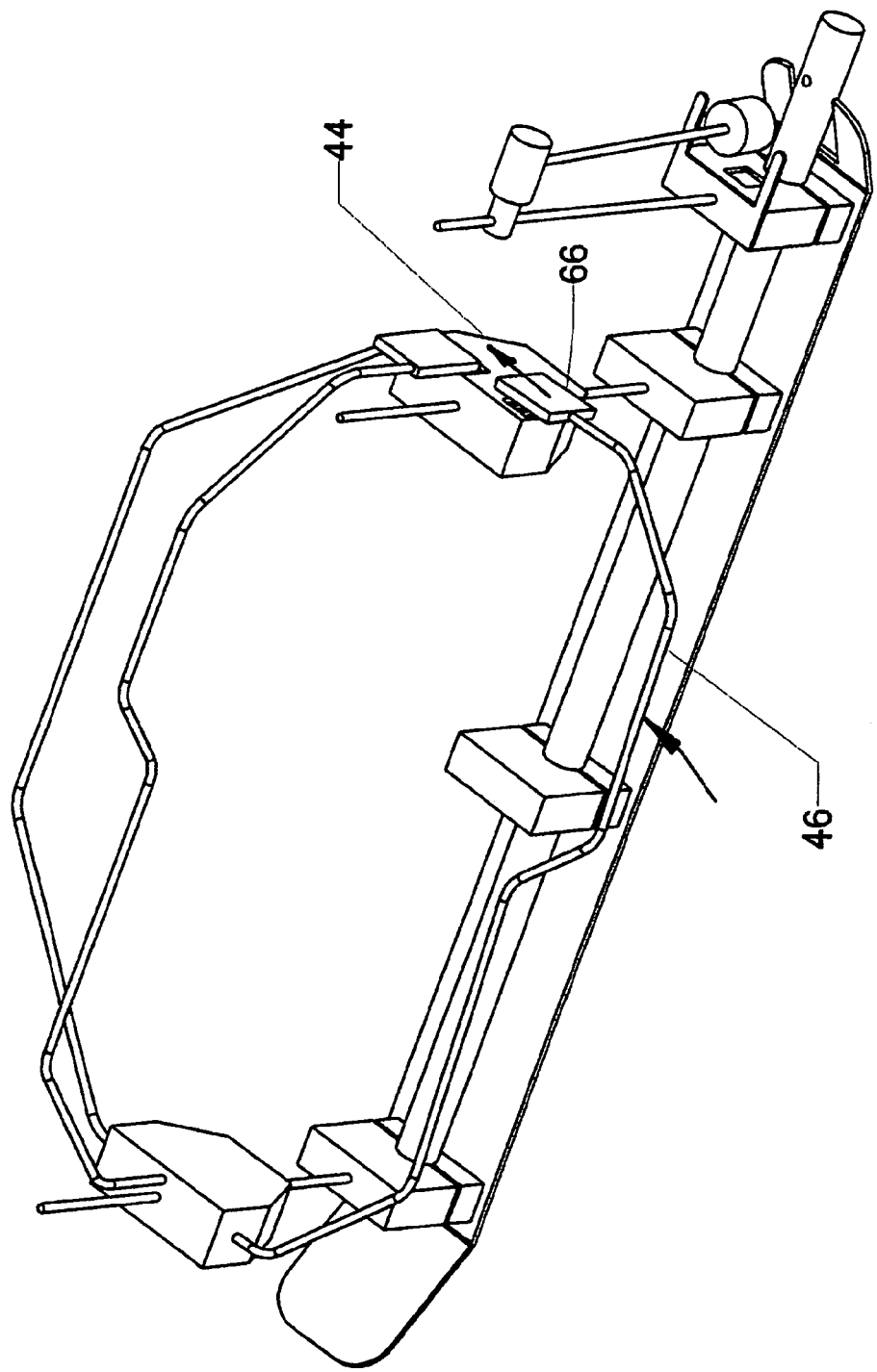
FIG. 5 is an isometric view, showing the deflection of the lateral test arm.

FIG. 5 illustrates the operation of lateral test arm 46. As explained previously, when test sled 10 encounters a reduction in the horizontal diameter 92 of a pipe, lateral test arm 46 deflects inward, as shown by the arrow. Lateral flag 66 is attached to the rearward end of lateral test arm 46. As lateral test arm 46 deflects inward, lateral flag 66 moves inward across the rearward face of rear bracket 44.

Figure 5B:
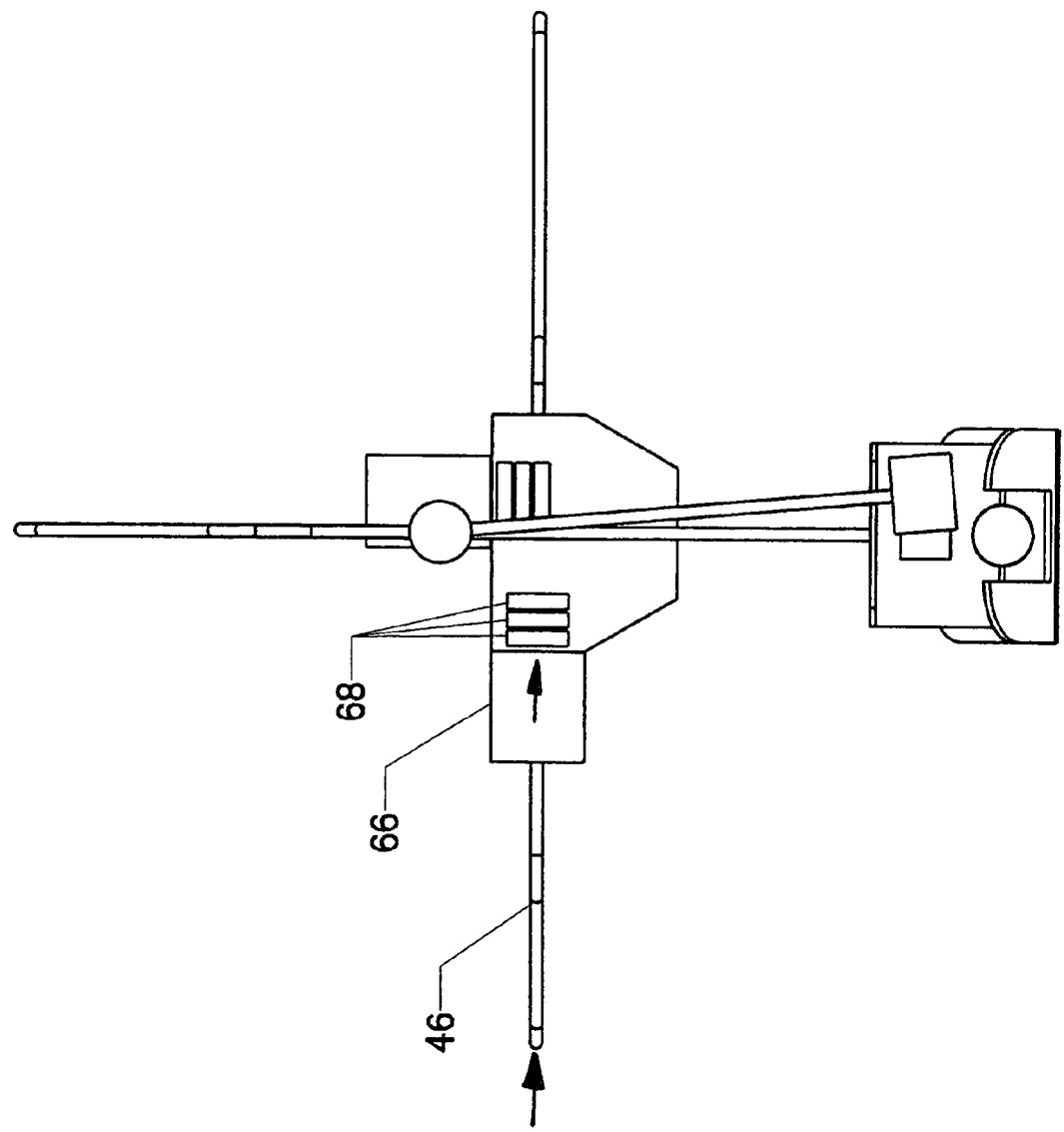
FIG. 5B is an elevation view, showing the operation of the lateral visual indicators.

FIG. 5B shows a view of the rear of test sled 10 with lateral test arm 46 in its undeflected state. When a force is applied to lateral test arm 46, lateral flag 66 moves inward in the direction indicated. As it does so, it begins to occlude a series of lateral indicators 68, which are affixed to the rearward face of rear bracket 44. This view approximates the user's view of the device, as the user looks down a pipe. FIG. 5C shows lateral test arm 46 in a deflected state. The reader will observe that two of the three lateral indicators 68 have been occluded, thus indicating to the user the state of the deflection. These lateral indicators 68 are typically color-coded strips or dots of highly reflective material. The use of color coding allows the user to discern the degree of deflection of lateral test arm 46 at great distances. It is important to note that test sled 10 conveys all of its information through the use of reflectors. It has no electrical power source whatsoever.

Figure 6:
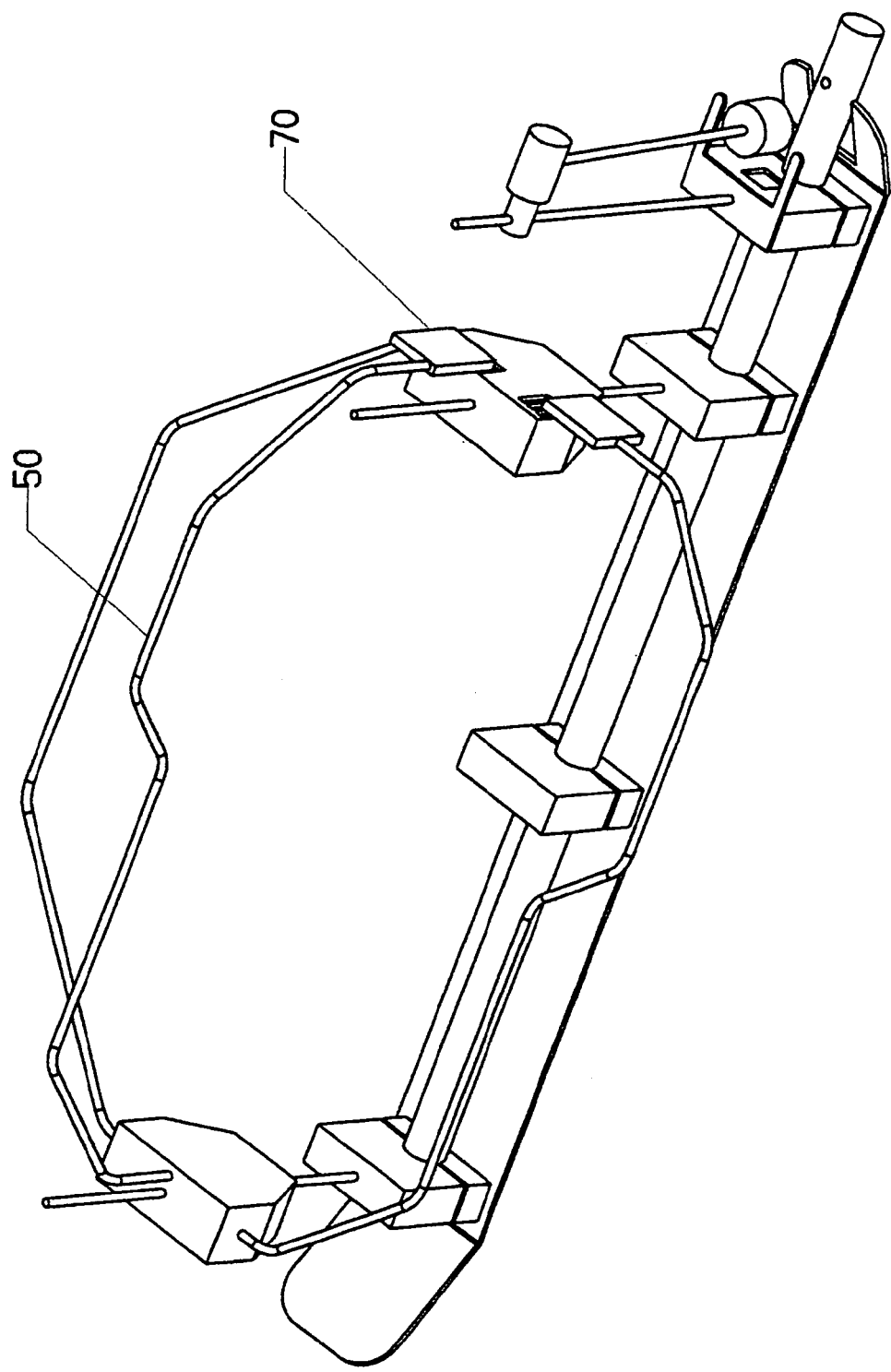
FIG. 6 is an isometric view, showing the deflection of the vertical test arm.
Figure 6B:
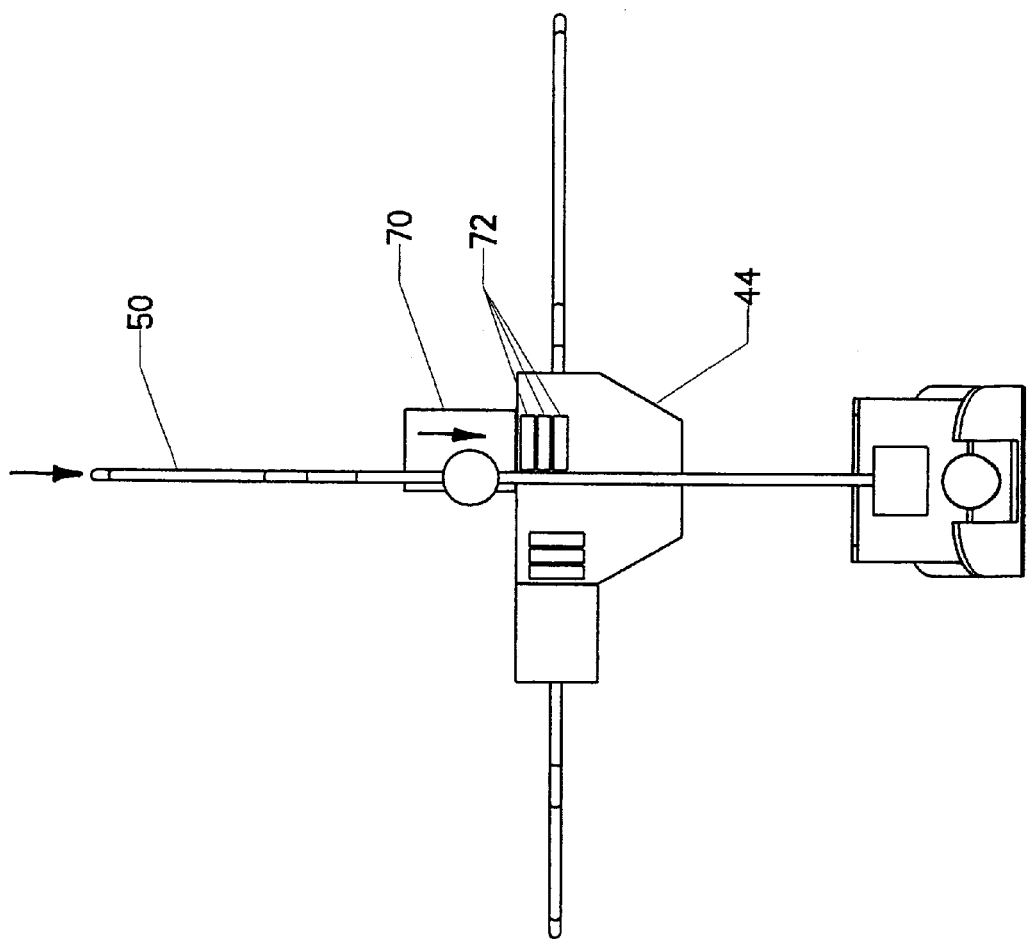
FIG. 6B is an isometric view, showing the operation of the vertical visual indicators.
Figure 6C:
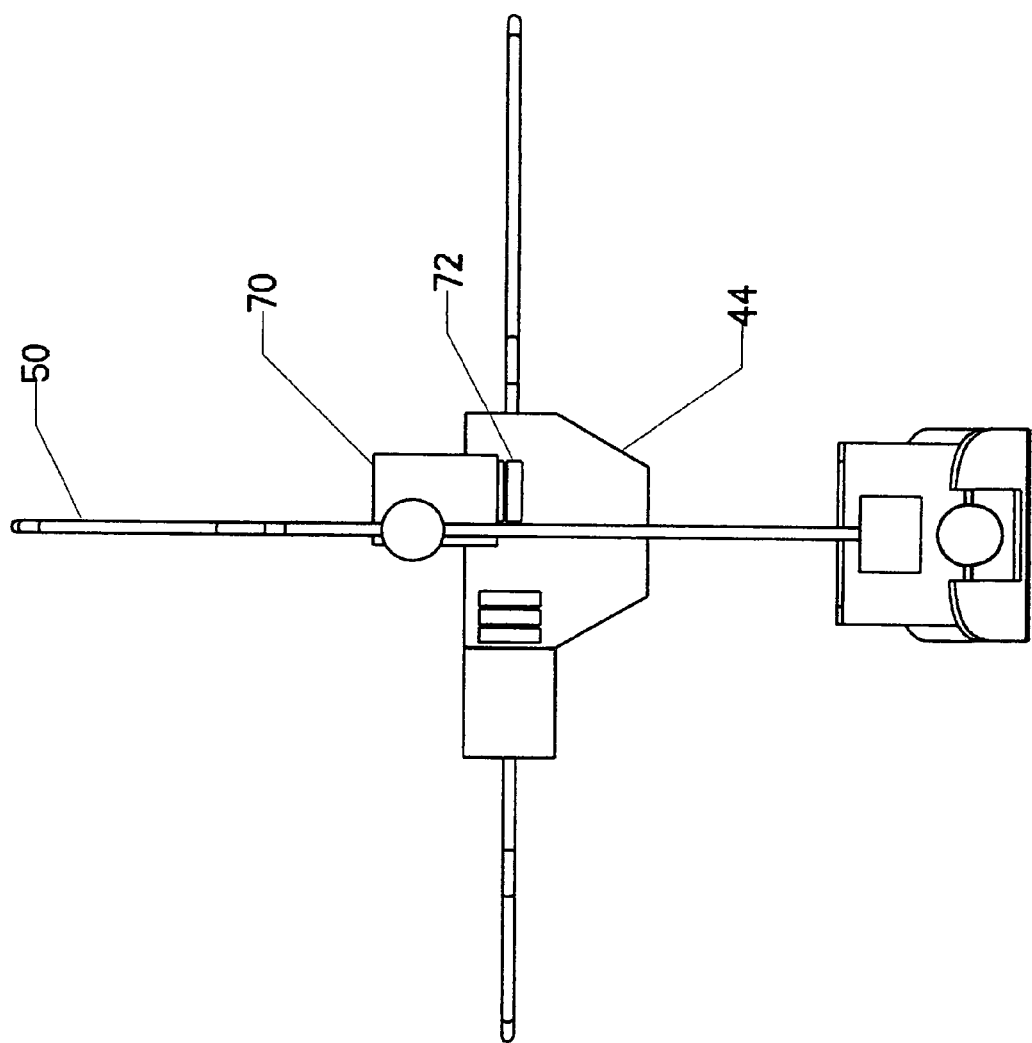
FIG. 6C is an elevation view, showing the operation of the vertical visual indicators.

FIG. 6 illustrates the presence of vertical flag 70 on the rear extremity of vertical test arm 50. As vertical test arm 50 is deflected downward via a reduction in the vertical pipe diameter, vertical flag 70 moves downward across the rearward face of rear bracket 44. FIG. 6B shows a rear view of vertical test arm 50 in its undeflected state. In this position, vertical flag 70 has not occluded vertical indicators 72. FIG. 6C shows vertical test arm 50 deflected downward. The reader will observe that vertical flag 70 has occluded two of the three vertical indicators 72. Again, through the use of color coding in the vertical indicators 72, the degree of deflection can be observed by the user over considerable distance.

Figure 7:
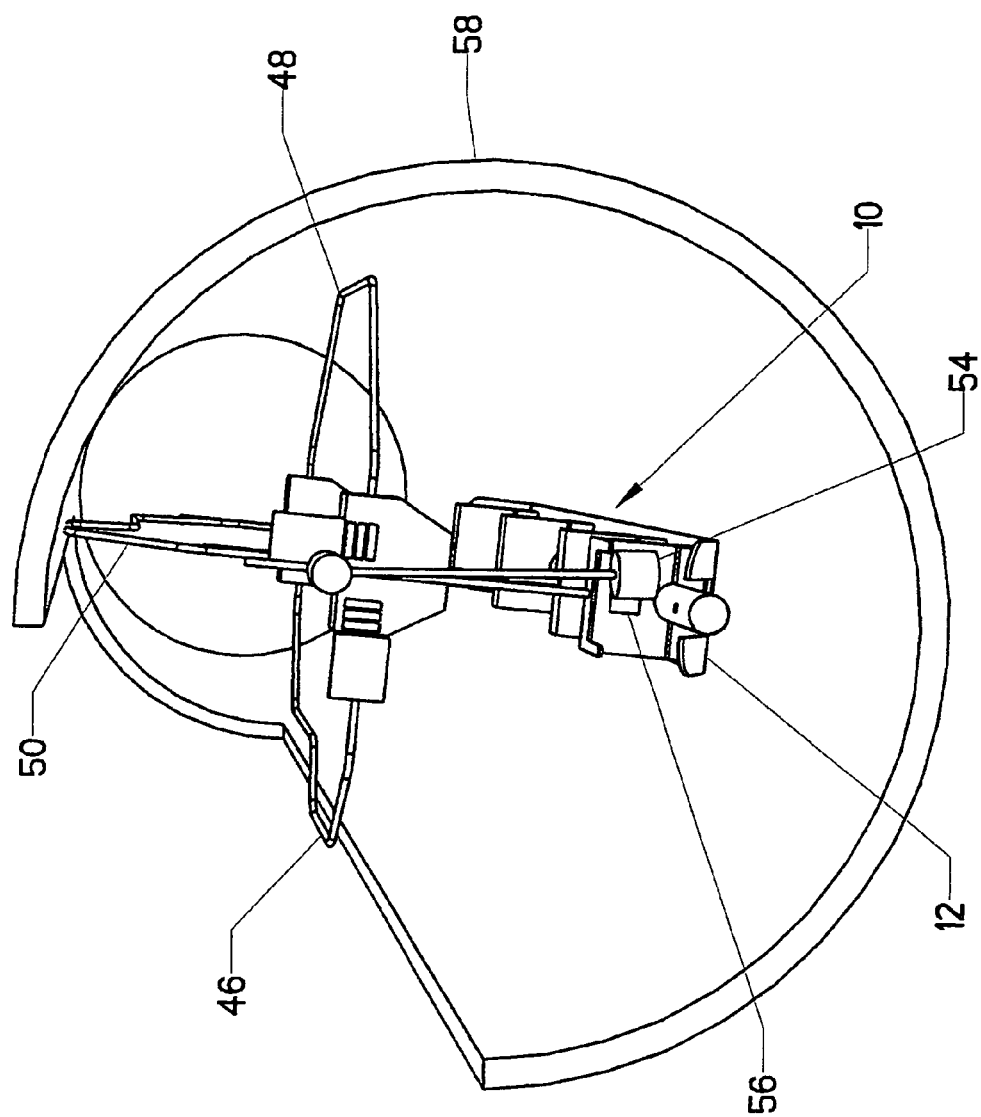
FIG. 7 is a perspective view, showing the operation of the plumb in keeping the inspection sled level.

FIG. 7 is a perspective view illustrating test sled 10 traveling through 18"-diameter pipe 58 (pipe 58 is shown with a cutaway). In this illustration, test sled 10 has become canted in a clockwise direction. The reader will observe that plumb 38 has remained vertical, with the result that plumb reflector 56 is now visible. The user is thereby informed that the device is not level and a correction is made.

FIG. 7B illustrates the measurement objectives of the device. 18"-diameter pipe 58 is roughly divided into top region 100, right side region 98, left side region 102, and bottom region 96. There is, of course, no clear demarcation between these regions since the pipe is ideally cylindrical. The objective is to measure values for horizontal diameter 92 and vertical diameter 94. In order to measure these values, the device must be level. Returning to FIG. 7, the reader will observe that the non-level state of the device means that lateral fixed arm 48 and lateral test arm 46 are not lying in the plane of horizontal diameter 92. Likewise, vertical test arm 50 is not lying in the plane of vertical diameter 94. A correction is therefore needed and the user can supply this by twisting the push rods as he or she advances the device.

FIG. 7 also illustrates well the device's operation. Lateral fixed arm 48 maintains contact with right side region 98. Lateral test arm 46 maintains contact with left side region 102. If a reduction in horizontal diameter 92 is encountered, lateral test arm 46 will deflect. Lateral test arm 46 is sufficiently flexible to allow the device to pass through a substantial constriction and continue onward.

Runner 12 maintains contact with bottom region 96. Vertical test arm 50 maintains contact with top region 100. If a reduction in the vertical diameter 94 is encountered, vertical test arm 50 will deflect. It is also sufficiently pliable to allow the device to pass through a constricted area and continue.

Those skilled in the art will appreciate that the width of runner 12 prevents the device from sitting on the lowest point of the pipe's interior. The width of runner 12 must be accounted for in determining the appropriate height of vertical test arm 50. This is especially true since the device contemplates that many different pipe diameters may have to be inspected.

One inspection sled 10 may be used to inspect a wide range of pipe diameters by incorporating adjustment features. Inspection sled 10 is adapted to inspect an 18"-diameter pipe. FIG. 8 depicts inspection sled 10 next to 24" inspection sled 74, which is adapted to inspect a 24"-diameter pipe.

24" inspection sled 74 is simply inspection sled 10 adjusted to fit a larger pipe. The reader will observe that forward bracket 42 has been moved up its mast and locked into a higher position. Likewise, rear bracket 44 has been moved upward. Larger test arms are also needed. 24" inspection sled 74 is equipped with 24" lateral fixed arm 76, 24" lateral test arm 78, and 24" vertical test arm 80. All these arms are easily removed and replaced. 24" inspection sled 74 is identical to inspection sled 10 in every respect, other than the vertical and horizontal adjustments and the different arms. In fact, in actual practice, the user will typically use only inspection sled with sets of different arms to accommodate the different pipe diameters.

Figure 9:
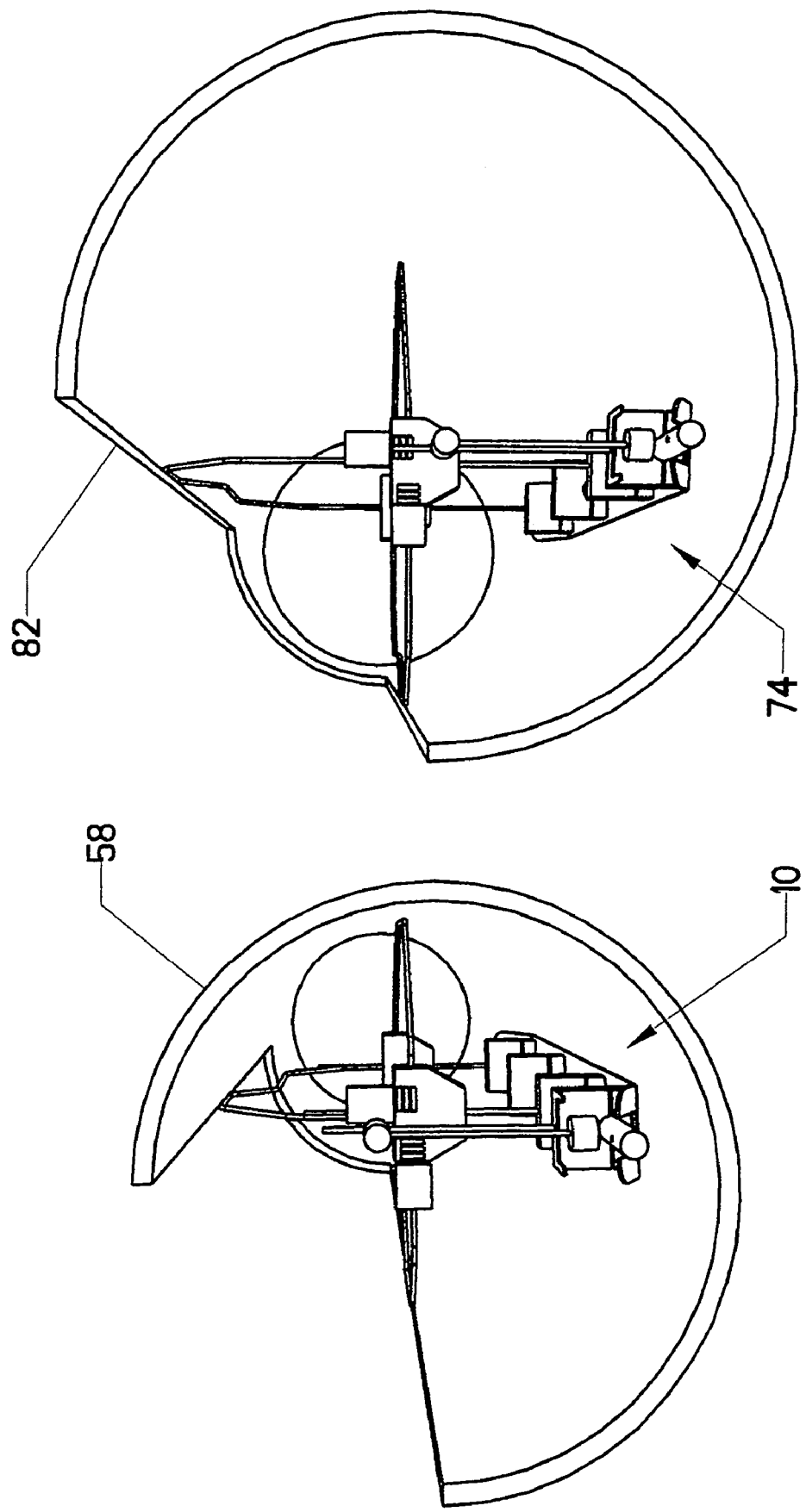
FIG. 9 is a perspective view, showing two inspection sleds in two pipes having different diameters.

FIG. 9 shows the two variants side by side. Inspection sled 10 fits tightly within 18"-diameter pipe 58. 24" inspection sled 74 fits tightly within 24"-diameter pipe 82. The reader will thus observe how the use of adjustments and the different arm sets allow a single inspection sled to be adapted to fit many different pipe diameters.

Figure 10:
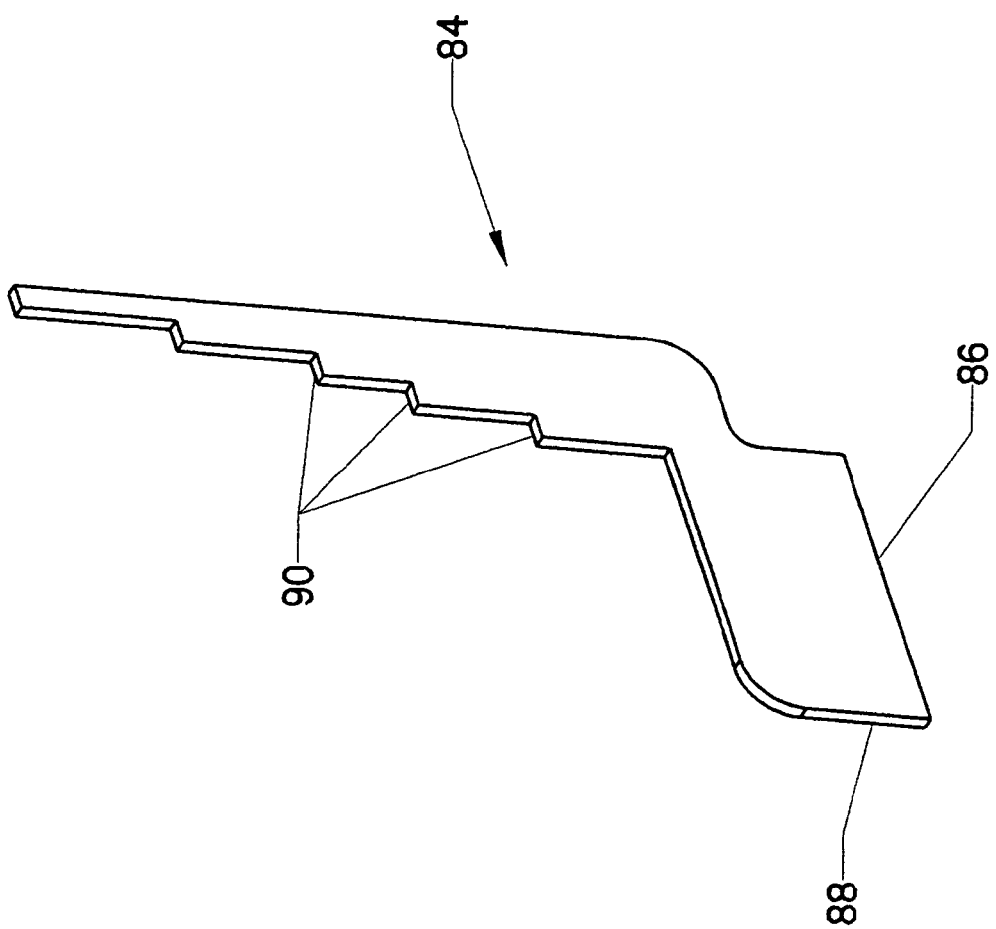
FIG. 10 is an isometric view, showing a gage used for calibration.

It is important to calibrate the inspection sled 10 for the particular diameter of pipe that will be inspected. This goal could be accomplished in many different ways, such as by providing markings on the masts and arms to indicate the correct adjusted positions. FIG. 10 illustrates another approach using a gage. Gage 84 has horizontal zero 88, vertical zero 86, and a series of calibration steps 90.

Figure 11:
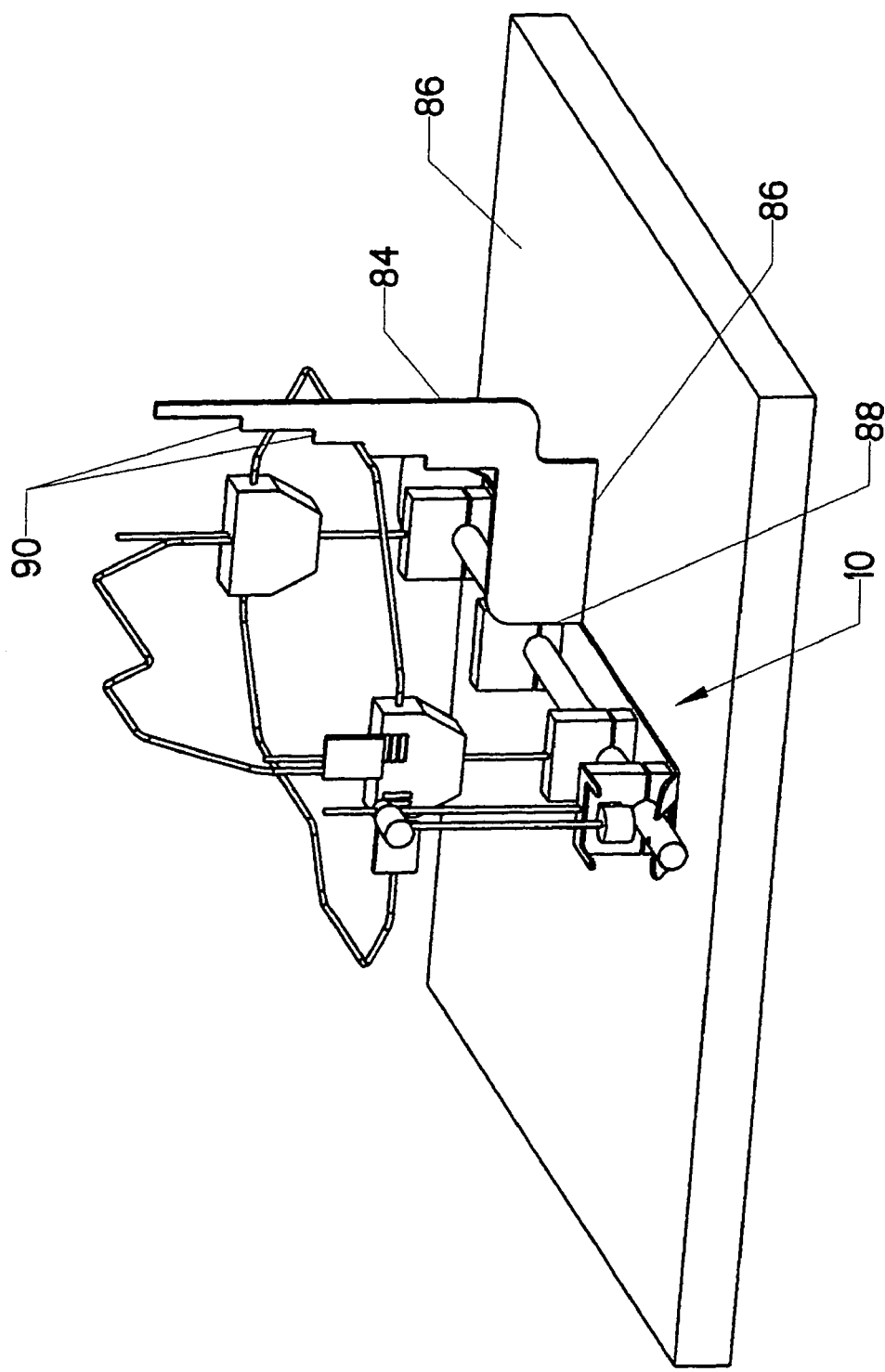
FIG. 11 is an isometric view, showing the application of a gage.

FIG. 11 illustrates the use of gage 84. Inspection sled 10 is placed on flat surface 86. Gage 84 is then placed against inspection sled 10, with vertical zero 86 being placed on flat surface 86 and horizontal zero 88 being placed against the side of runner 12. A particular calibration step 90 (depending on the pipe diameter involved) is use to set the correct position or lateral fixed arm 48, and likewise for lateral test arm 46. The calibration steps 90 are marked to indicate which one should be used. A similar gage can be fabricated and employed for vertical test arm 50.

The device disclosed in FIGS. 1–11 is capable of measuring deflections in a pipe's vertical 94 and horizontal 92 diameters. Practical experience illustrates that a reduction in the pipe's vertical diameter 94 is the more significant measurement, since this indicates settling of the soil around the pipe. A variation only measuring the pipe's vertical diameter 94 can therefore provide the most needed information and also reduce complexity.

In addition, the device disclosed in FIGS. 1–11 has been found to have certain limitations in its visual indicating system. It is common for the user to advance the device up to 100 feet into a pipe. At that distance, it is difficult for the user to discern the degree of occlusion of lateral indicators 68 and vertical indicators 72. This is true even though different colors are used for successive indicators. At ranges approaching 100 feet, human vision simply blurs the two colors together and makes it difficult to observe the degree of occlusion. Thus, a more sophisticated visual indicating system is desirable.

Figure 12:
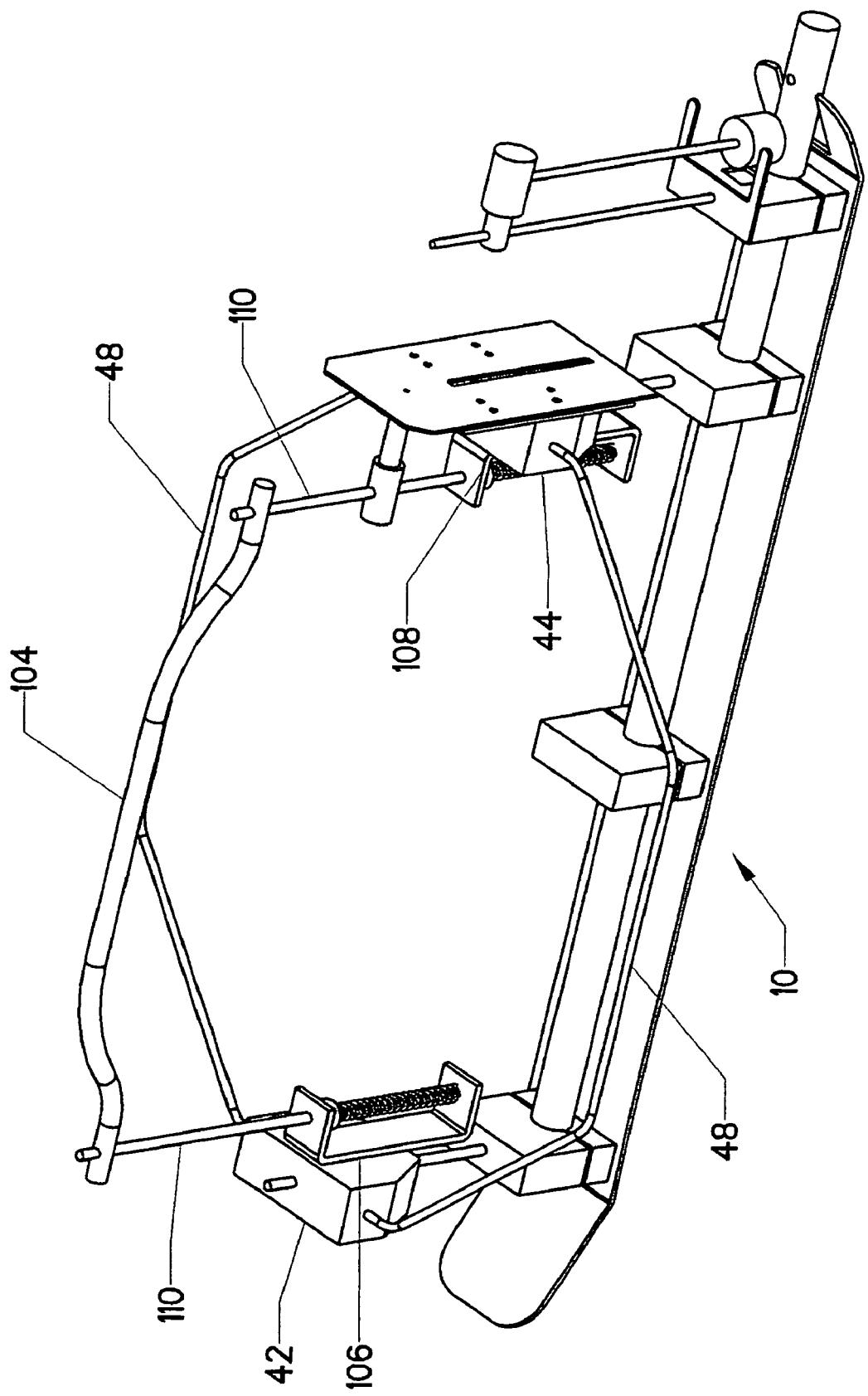
FIG. 12 is an isometric view, showing a refined version which represents the preferred embodiment.

FIGS. 12–18 illustrate a second embodiment addressing these concerns. Because this version remedies the problems just discussed, it is the preferred embodiment. As seen in FIG. 12, the structure of inspection sled 10 is the same with only a few exceptions. Because the preferred embodiment is not designed to measure deflections in a pipe's horizontal diameter 92, it has two lateral fixed arms 48. Vertical deflection bar 104 is designed to measure reductions in a pipe's vertical diameter 94, using a refined system. The user will observe that forward spring bracket 106 is attached to forward bracket 42. Likewise, rear spring bracket 108 is attached to rear bracket 46.

Both forward spring bracket 106 and rear spring bracket 108 have a guide rod 110 passing through them. Guide rods 110 are free to move up and down relative to the two spring brackets. Vertical deflection bar 104 is attached to the upper end of each guide rod 110. Springs are employed to bias vertical deflection bar 104 toward its upper position—as shown.

Figure 13:
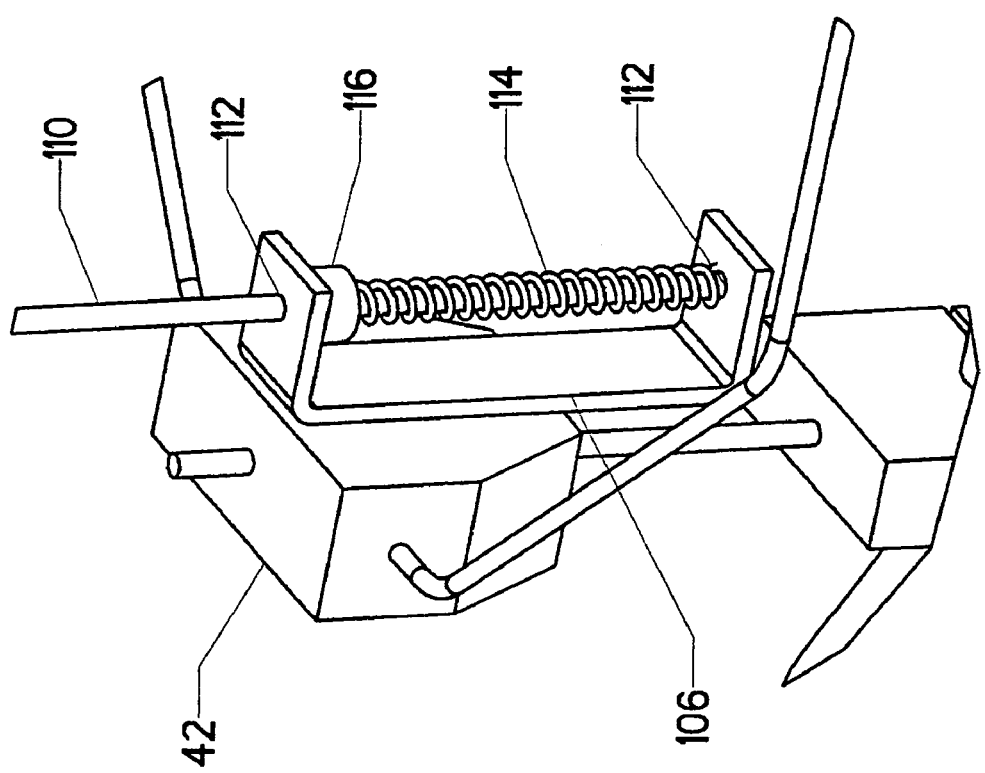
FIG. 13 is a detail view of the preferred embodiment.

FIG. 13 is a detail view. The reader will observe that the two horizontal portions of forward spring bracket 106 are each pierced by a guide rod hole 112. Guide rod 110 slides up and down within guide rod holes 112. Stop collar 116 is adjustably attached to guide rod 110. Compression spring 114 fits closely around guide rod 110. Its lower end bears against forward spring bracket 106. Its upper end bears against the lower surface of stop collar 116.

Identical components are located proximate rear spring bracket 108. The result is that the two guide rods 110 are naturally biased upward, resulting in vertical deflection bar 104 being naturally biased upward.

Figure 14:
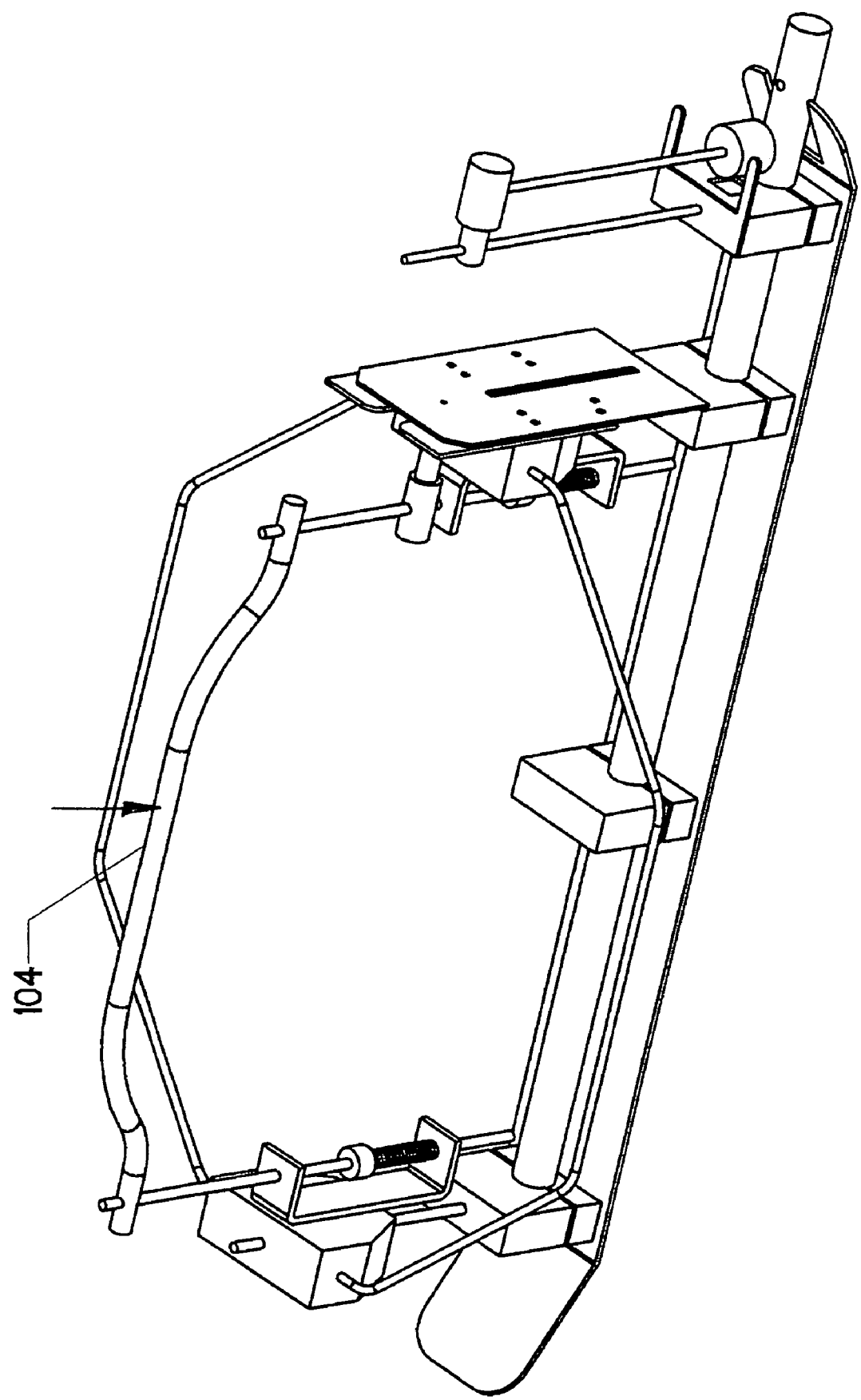
FIG. 14 is an isometric view, showing the preferred embodiment with its vertical deflection bar translated downward.
Figure 15:
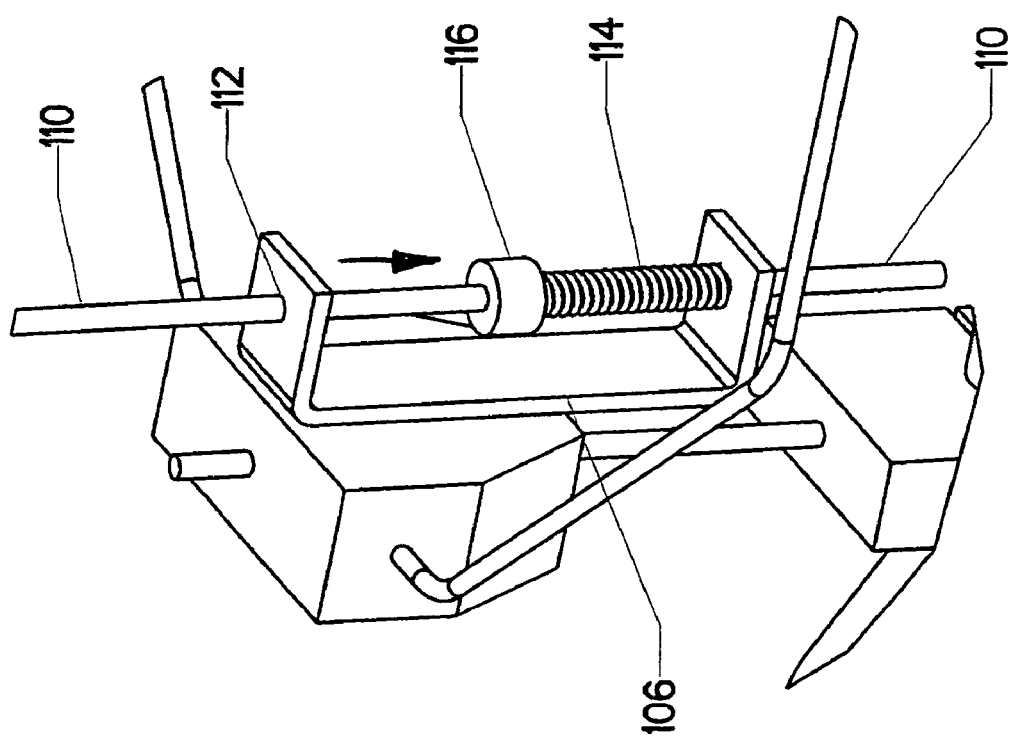
FIG. 15 is a detail view of the preferred embodiment.

FIG. 14 shows the device as it would appear upon encountering a reduction in a pipe's vertical diameter 94. Vertical deflection bar 104 has been forced downward as indicated by the arrow, resulting in guide rods 110 moving downward. FIG. 15 shows a detail view of forward spring bracket 106 as vertical deflection bar 104 is forced downward. The reader will observe that guide rod 110 has moved downward as indicated. Stop collar 116 has also moved downward, resulting in the compression of compression spring 114. Once the region of reduced vertical diameter 94 within the pipe is passed, compression springs 114 will restore the device to its undeflected state.

Figure 16:
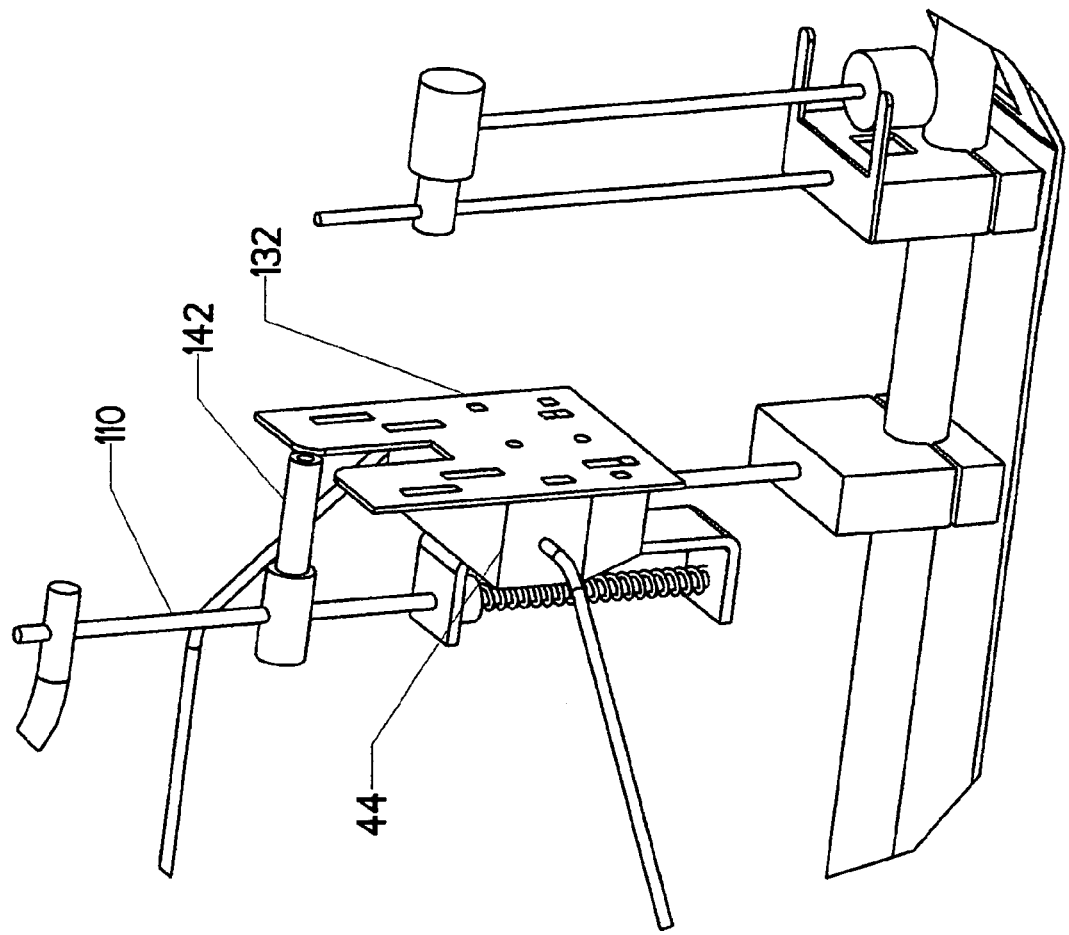
FIG. 16 is a detail view, illustrating portions of the visual indicator system.

The use of this revised system for measuring vertical deflection is quite effective. However, an improved means of visually communicating the degree of deflection to the user is also needed. FIGS. 16–18 and 21–23 illustrate the improved indicating system. In FIG. 16, reflector card 132 has been attached to the rear face of rear bracket 44. The reader will also observe that card mount 142 has been attached to the rear guide rod 110. Card mount 142 will also move up and down with guide rod 110. Accordingly, reflector card 132 is provided with a vertical slot allowing for clearance as card mount 142 moves downward.

Figure 17:
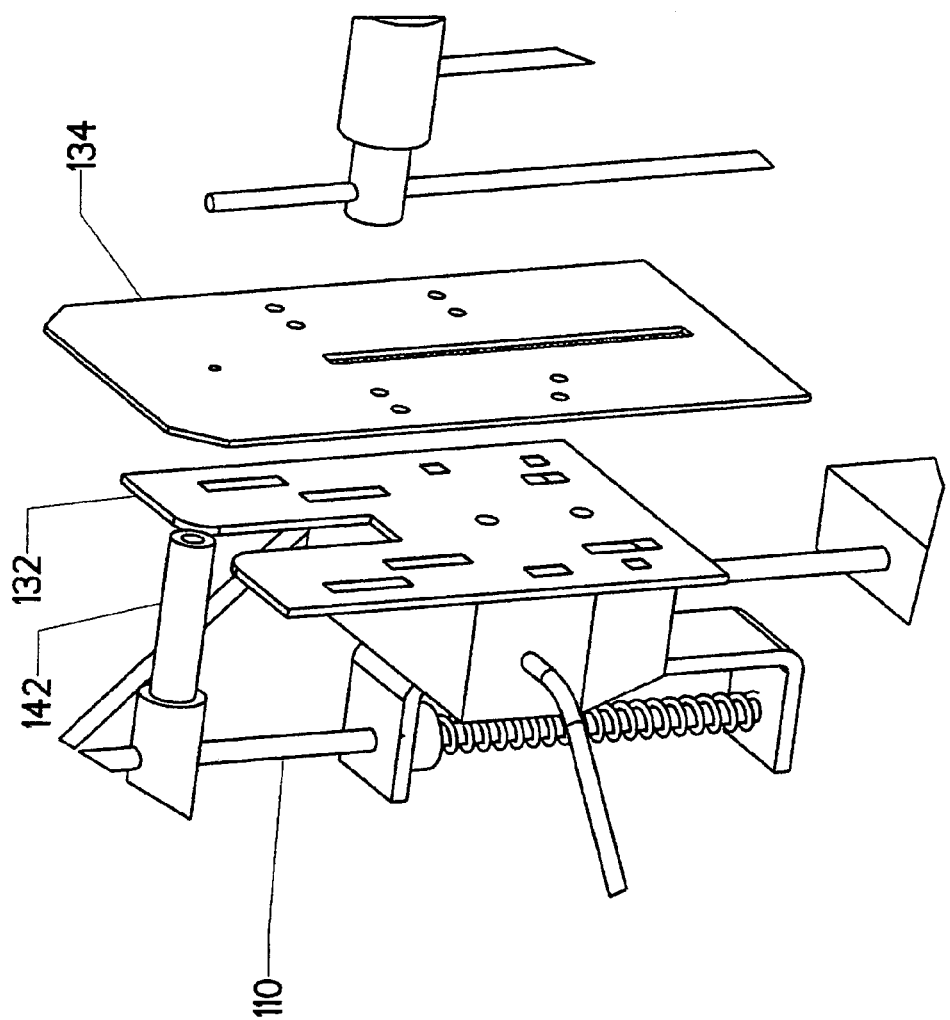
FIG. 17 is a detail view, illustrating portions of the visual indicator system.

In FIG. 17, the reader will note that window card 134 is positioned to be attached to card mount 142 so that it slides up and down with guide rod 110. Window card 134 has eight windows 136, which allow the display of reflectors placed on reflector card 132. Window card 134 is configured to slide up and down over the rear surface of reflector card 132.

Figure 17B:
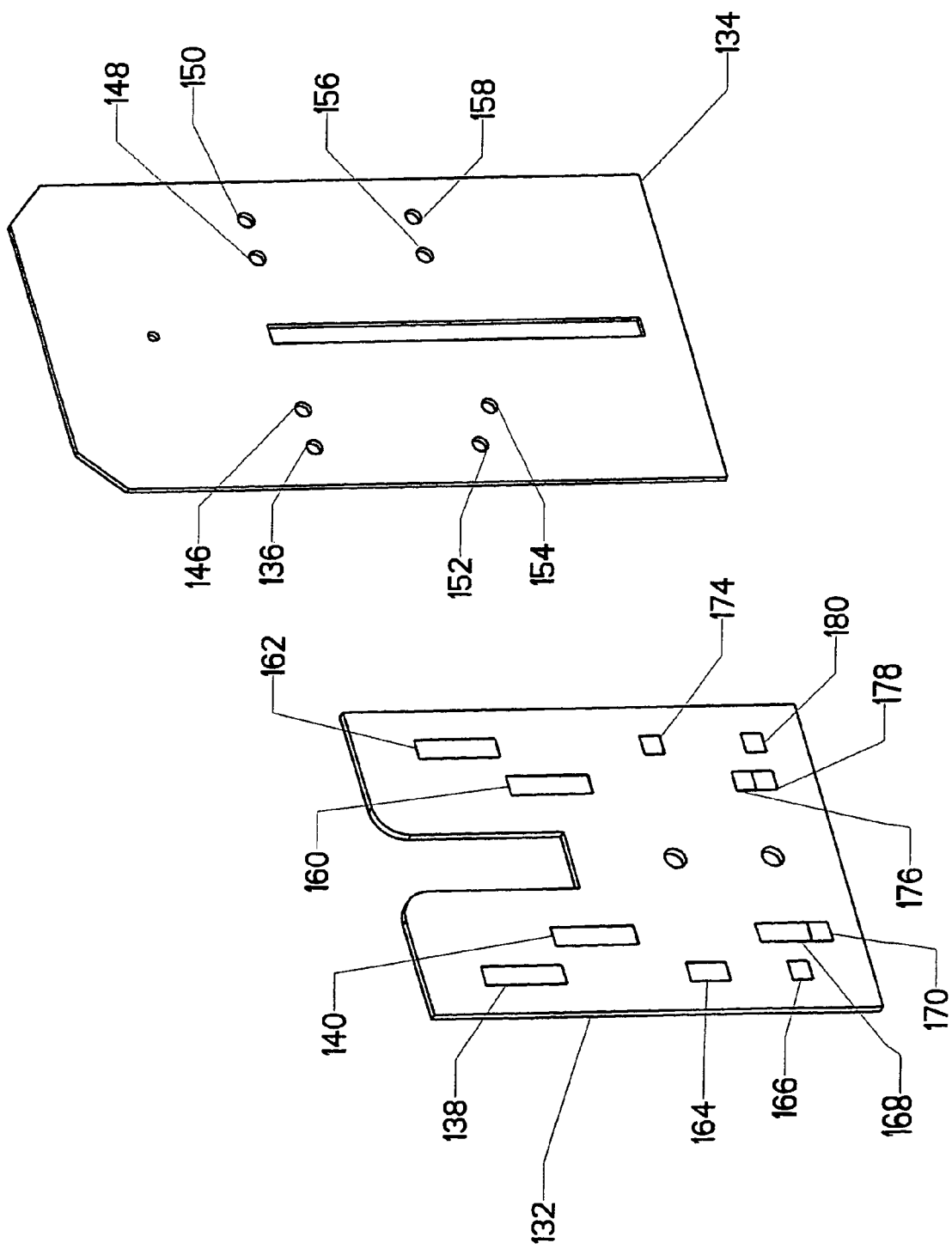
FIG. 17B is an isometric view, illustrating details of the visual indicator system.

FIG. 17B shows reflector card 132 and window card 134 placed side by side for comparison. Ordinarily, of course, window card 134 would be placed over the front of reflector card 132. As deflection in the internal diameter for the pipe is encountered, window card 134 slides up and down relative to reflector card 132. Various reflectors are thereby exposed through the eight windows in window card 134.

The following is a listing of the reflectors found on reflector card 132 in the preferred embodiment: (1) First reflector 138, fourth reflector 162, fifth reflector 164, and ninth reflector 174 are green; (2) Second reflector 140, third reflector 160, seventh reflector 168, and tenth reflector 176 are yellow; and (3) Sixth reflector 166, eighth reflector 170, eleventh reflector 178, and twelfth reflector 180 are red. The eight windows on window card 134 are configured to interact with these reflectors in order to convey information to the user.

FIG. 18 shows window card 134 mounted in place. In the view shown, the device has encountered a reduction in the pipe's vertical diameter 94, resulting in the downward movement of vertical deflection bar 104. Guide rod 110 has moved downward as indicated. Window card 134, being connected to guide rod 110, has moved downward relative to reflector card 132. The windows on window card 134 are exposing certain reflectors, thereby indicating the degree of deflection to the user.

The arrangement of reflectors on reflector card 132 and windows on window card 134 can be configured to convey a great deal of information. A series of examples is provided in FIGS. 21 through 23.

Figure 21:
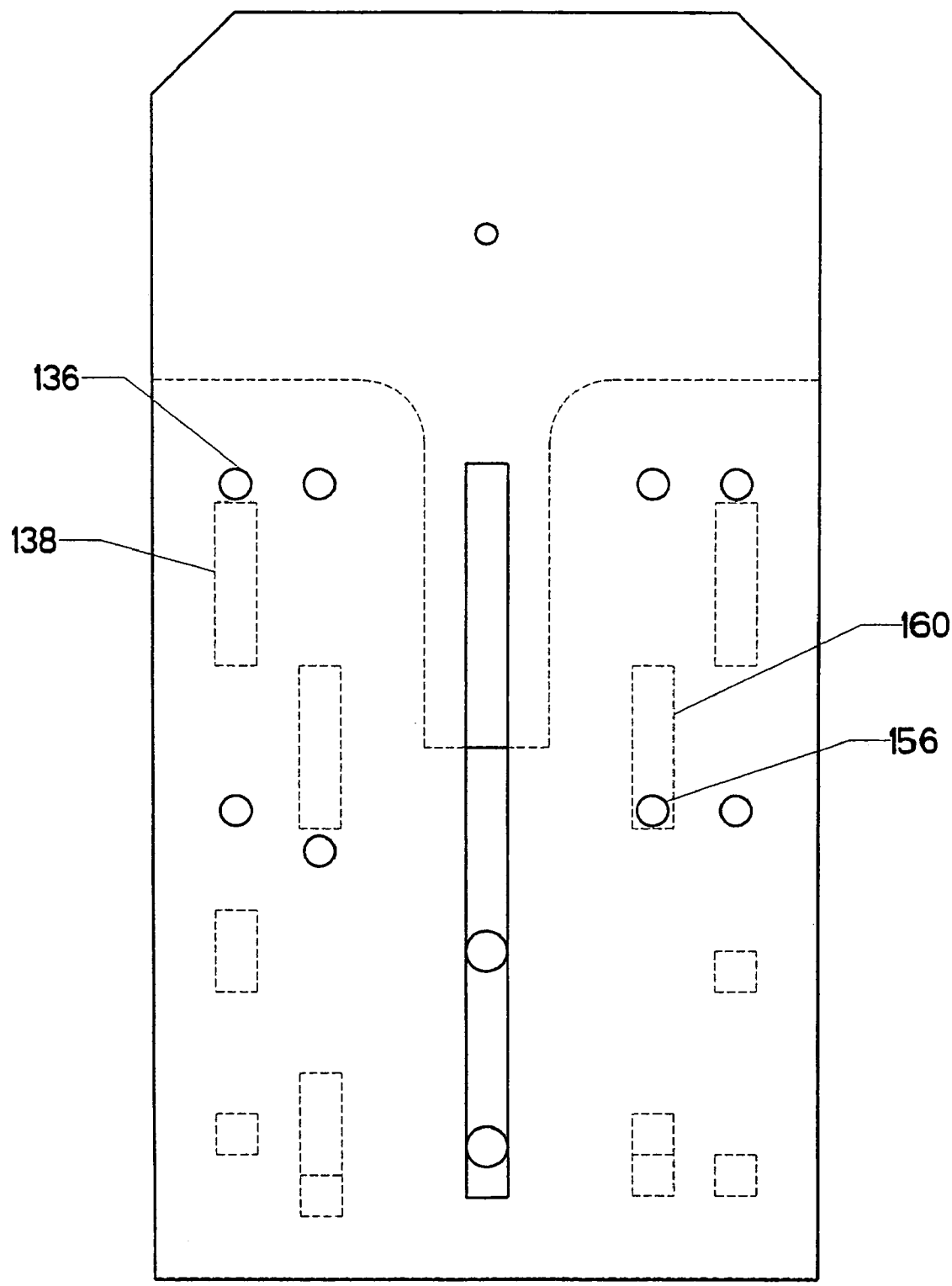
FIG. 21 is an elevation view, illustrating details of the visual indicator system.

FIG. 21 shows window card 134 in front of reflector card 132. The features of reflector card 132 can be seen as hidden lines. In this view, window card 134 has traveled downward with respect to reflector card 132. A portion of third reflector 160 (yellow) is visible through seventh window 156.

Figure 22:
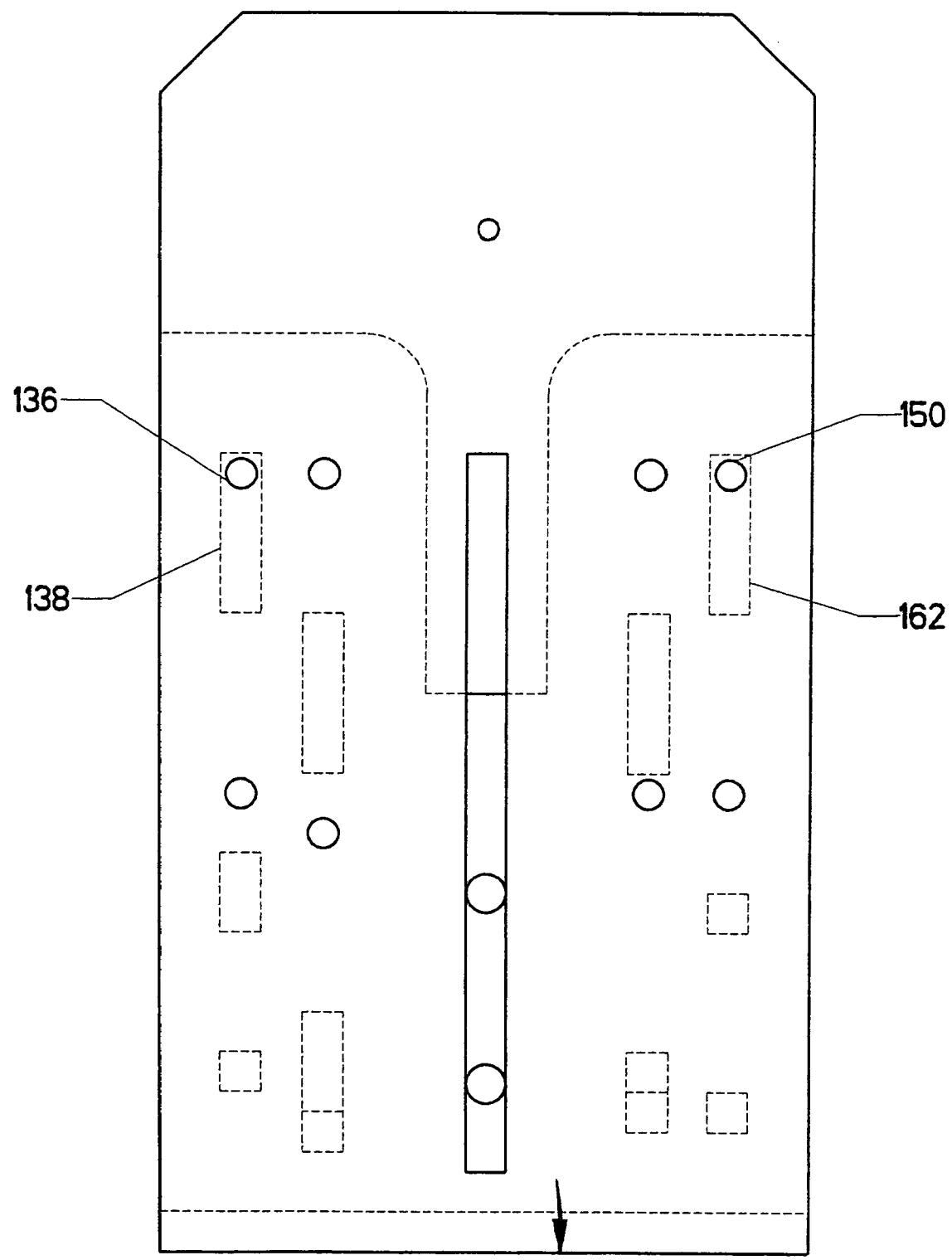
FIG. 22 is an elevation view, illustrating details of the visual indicator system.

FIG. 22 shows window card 134 after it has traveled further downward. The reader will observe that a portion of first reflector 138 (green) is visible through first window 136. Likewise, a portion of fourth reflector 162 (green) is visible through fourth window 150.

Figure 23:
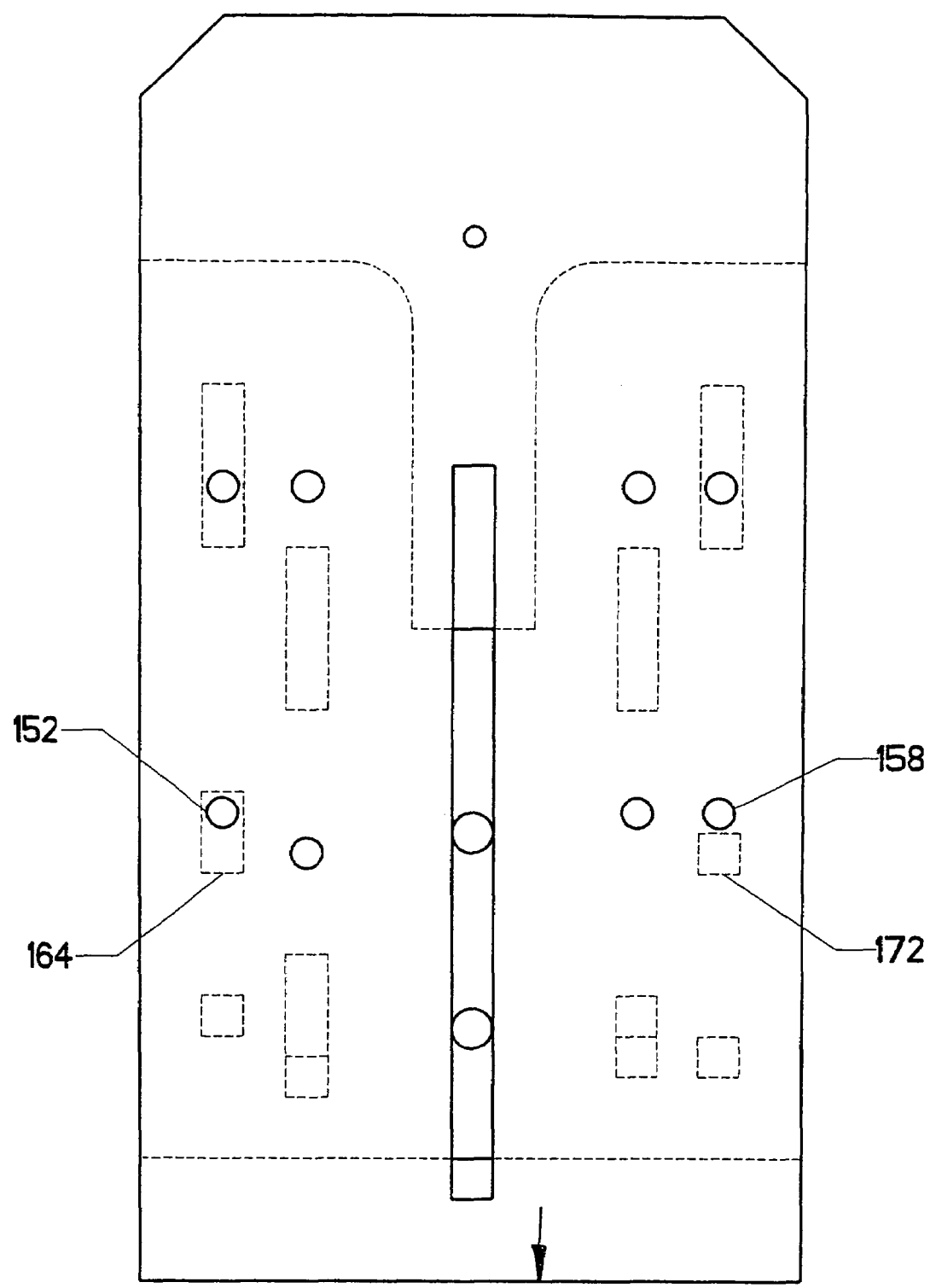
FIG. 23 is an elevation view, illustrating details of the visual indicator system.

FIG. 23 shows window card 134 after it has traveled still further downward. In addition to the reflectors visible in FIG. 22, the reader will observe that a portion of fifth reflector 164 (green) is visible through fifth window 152. Thus, through the use of the reflectors, the device can communicate very fine readings on the degree of deflection encountered.

It is obviously important to keep window card 134 aligned with reflector card 132. Returning now to FIG. 18, guide slot 144 is provided through window card 134. This slot engages guide bushings mounted on reflector card 132 to prevent skew. For purposes of visual clarity, these guide bushings have not been shown. Those skilled in the art will appreciate that additional windows and reflectors could be provided to convey even more detailed information. The concept for such additional indicators would be identical to that for the ones described.

The preferred embodiment encompasses adjustments allowing it to be used for different pipe diameters. Returning to FIGS. 12 and 13, those skilled in the art will appreciate that the position of the two stop collars 116 on the two guide rods 110 will determine the vertical position of vertical deflection bar 104 in the undeflected state. Thus, adjustment means (such as a set screw and a corresponding series of detents in guide rods 110) can be provided to allow the user to set the vertical position of vertical deflection bar 104 for a variety of different pipe diameters. Of course, different sets of lateral fixed arms 48 must still be employed.

Figure 19:
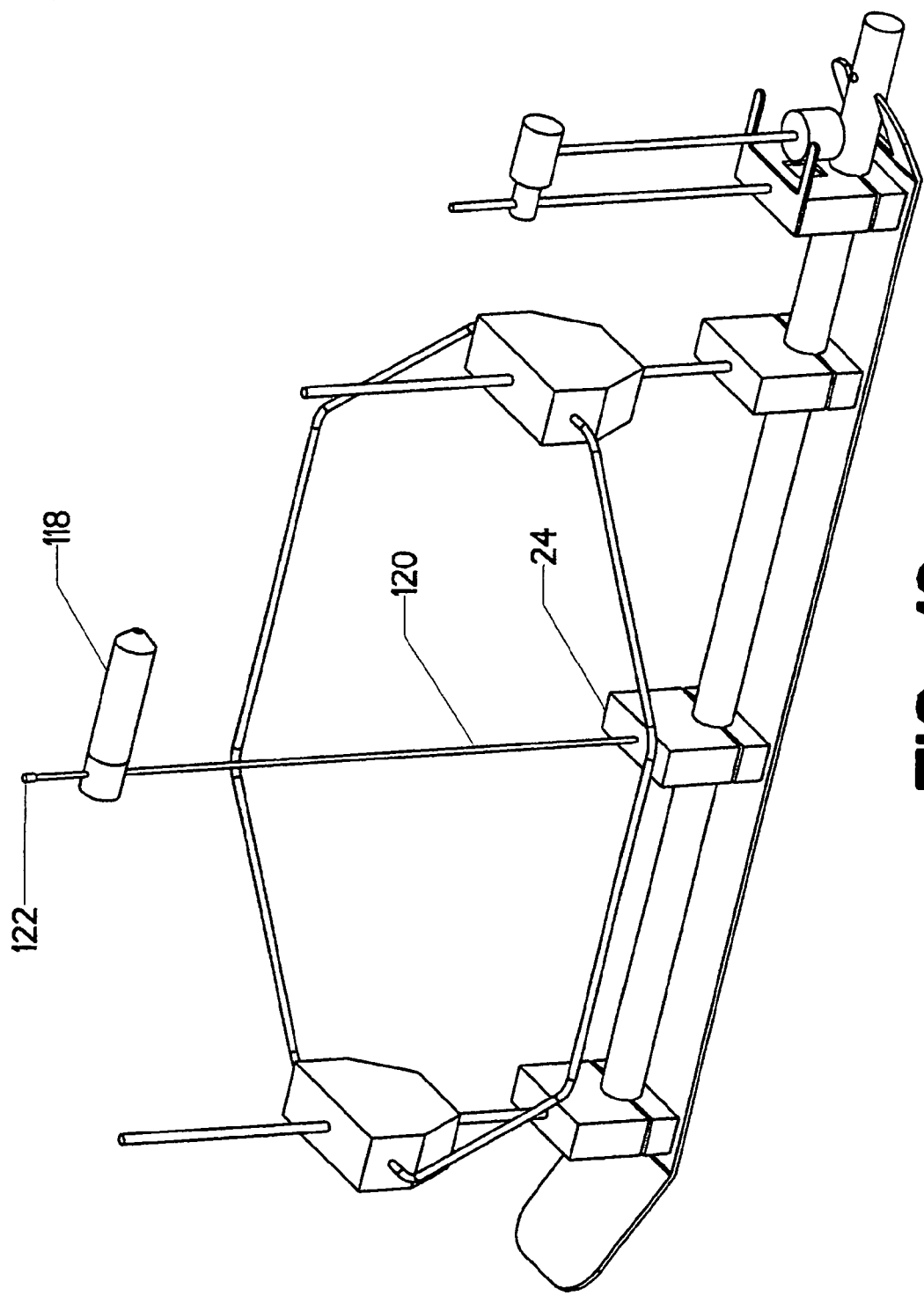
FIG. 19 is an isometric view, showing another simplified embodiment.
Figure 20:
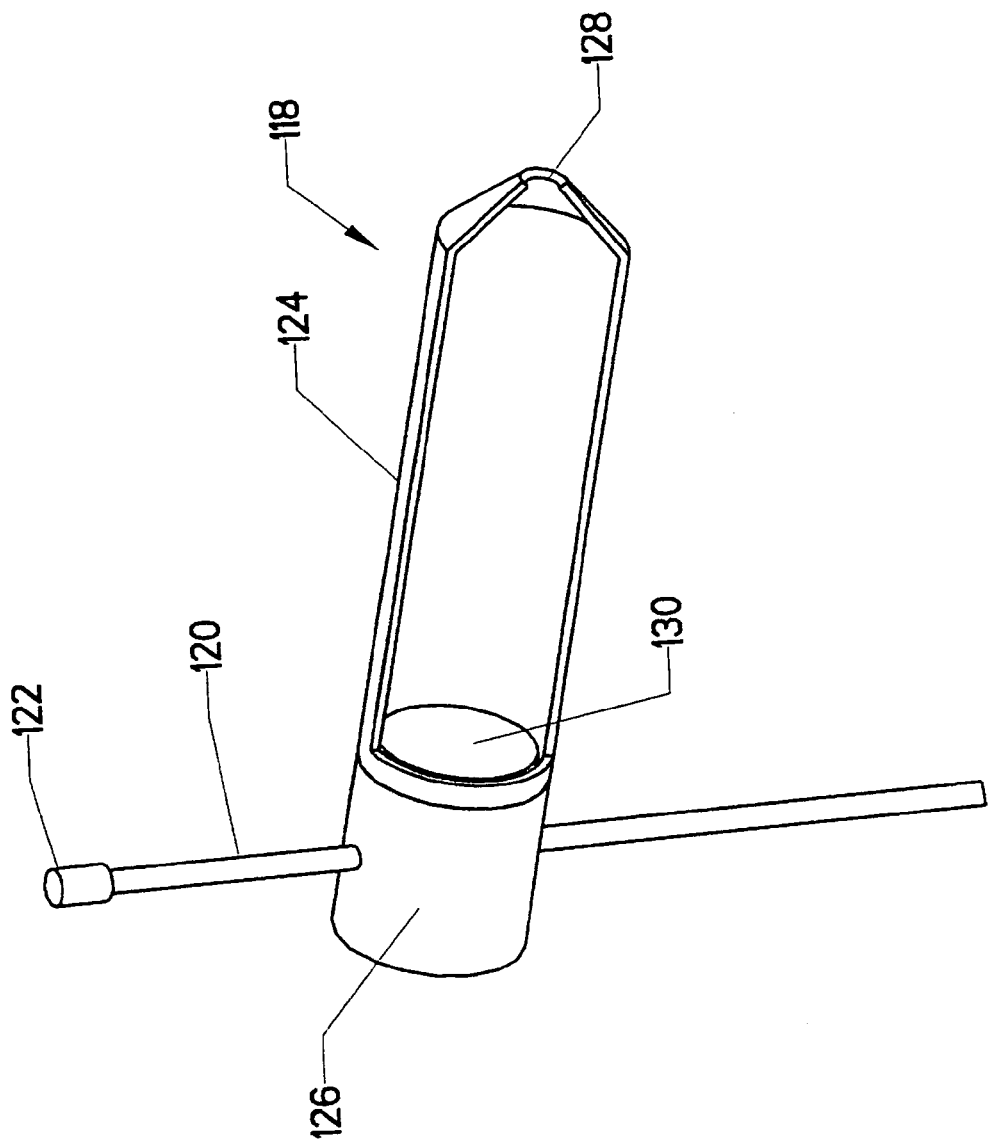
FIG. 20 is a detail view, showing some details of the simplified embodiment.

Some users have expressed a desire for a very simply "pass-fail" version of the device. This embodiment would provide a single indication of a failing condition in a pipe's vertical diameter 94. FIGS. 19 and 20 illustrate such a device. This is a quick test method that could be followed by more precise methods using other features of the device.

In FIG. 19, inspection sled 10 has two lateral fixed arms 48. Rising from middle tube clamp 24 is flex mast 120. Flex mast 120 is typically made from a resilient material and has the general characteristics of an automotive radio antenna. Flex mast 120 is topped by contact point 122. Point reflector 118 is attached to flex mast 120 just below contact point 122.

FIG. 20 shows point reflector 118 in more detail. Tube mount 126 attaches tube 124 to flex mast 120. Tube 124 is hollow (shown with a cutaway). Its forward portion contains reflector 130. Its rearward portion tapers to orifice 128. As a user shines a flashlight toward the device in a pipe, light enters through orifice 128, strikes reflector 130, and bounces back to the user as a single bright point of light.

The height of contact point 122 is set equal to the minimum acceptable vertical diameter 94 for the pipe being inspected. Likewise, lateral fixed arms corresponding to the minimum acceptable horizontal diameter for pipe the pipe are employed. If contact point 122 encounters a smaller vertical diameter 94, flex mast 120 will bend backward, angling tube 124 downward. The geometry of the device then prevents the reflection of the user's flashlight beam. From the user's vantage point, the single bright point of light disappears. When this happens, the user knows that a failing condition is present. The user may then wish to reconfigure the device using the window card and reflector card to obtain more information.

Accordingly, the reader will appreciate that the proposed invention provides a simple device for measuring constrictions in the diameter of buried piping. The invention has additional advantages in that:

1. It can be adjusted to inspect different sizes of pipe;
2. It does not require a cable to be passed through the pipe before introducing the inspection device;
3. It is not easily obstructed by puddles or debris within the pipe;
4. It can pass beyond an obstructed diameter to inspect the entire pipe; and
5. It provides a simple visual indication system requiring no internal electrical devices.

Although the preceding description contains significant detail, it should not be construed as limiting the scope of the invention but rather as providing illustrations of the various embodiments of the invention. Thus, the scope of the invention should be fixed by the following claims, rather than by the examples given.

Having described our invention, we claim:

1. A pipeline inspection device allowing a user to direct a light toward said inspection device and thereby visibly inspect for deformation of a pipeline, with said pipeline having an internal diameter generally composed of a bottom region, two side regions, and a top region, and having a horizontal diameter and a vertical diameter, comprising:

a. a base portion, having a forward end and a rear end, configured to move along said bottom region of said internal diameter so that it lies on said vertical diameter;

b. a vertical deflection bar, having a forward end and a rear end, oriented vertically, and being mounted to said base portion by movable means, so that said vertical deflection bar lies on said vertical diameter, with a portion of said verticle deflection bar extending outward far enough from said base portion to contact said top region of said internal diameter, and wherein said vertical deflection bar is free to move downward when said inspection device encounters a reduction in said vertical diameter of said pipeline;

c. biasing means positioned to bias said verticle deflection bar upward;

d. a reflector attached to said base portion and positioned so as to be visible to said user when said user shines said light on said rear end of said base portion from far away; and e. an occluding device, moveable in relation to said reflector, and connected to said vertical deflection bar so that as said vertical deflection bar moves downward, said occluding device occludes said reflector, thereby indicating to said user that a reduction in said vertical diameter of said pipeline has been encountered.

2. A pipeline inspection device as recited in claim 1, further comprising:

a. a plumb, rotatably mounted to said base portion proximate said rear end, and wherein said plumb is normally oriented vertically; and b. a plumb reflector, affixed to said base proximate said rear end immediately forward of said plumb and sized so that so long as said plumb remains in said vertical orientation, said plumb reflector is not visible to said user.

3. A pipeline inspection device allowing a user to direct a light toward said inspection device and thereby visibly inspect for deformation of a pipeline, with said pipeline having an internal diameter generally composed of a bottom region, two side regions, and a top region, and having a horizontal diameter and a vertical diameter, comprising:

a. a base portion, having a forward end and a rear end, configured to move along said bottom region of said internal diameter so that it lies on said vertical diameter;

b. a vertical deflection bar, having a forward end and a rear end, oriented vertically, and being mounted to said base portion by movable means, so that said vertical deflection bar lies on said vertical diameter, with a portion of said vertical deflection bar extending outward far enough from said base portion to contact said top region of said internal diameter, and wherein said vertical deflection bar is free to move downward when said inspection device encounters a reduction in said vertical diameter of said pipeline;

c. biasing means positioned to bias said vertical deflection bar upward;

d. a reflector attached to said base portion and positioned so as to be visible to said user when said user shines said light on said rear end of said base portion from far away; and e. an occluding device, moveable in relation to said reflector, and connected to said vertical deflection bar so that said occluding device normally occludes said reflector, but as said vertical deflection bar moves downward, said occluding device exposes said reflector, thereby indicating to said user that a reduction in said vertical diameter of said pipeline has been encountered.

4. A pipeline inspection device as recited in claim 3, further comprising:

a. a plumb, rotatably mounted to said base portion proximate said rear end, and wherein said plumb is normally oriented vertically; and b. a plumb reflector, affixed to said base proximate said rear end immediately forward of said plumb and sized so that so long as said plumb remains in said vertical orientation, said plumb reflector is not visible to said user.

5. A pipeline inspection device allowing a user to direct a light toward said inspection device and thereby visibly inspect for deformation of a pipeline, with said pipeline having an internal diameter generally composed of a bottom region, two side regions, and a top region, and having a horizontal diameter and a vertical diameter, comprising:

a. a base portion, having a forward end and a rear end, configured to move along said bottom region of said internal diameter so that it lies on said vertical diameter;

b. a vertical deflection bar, having a forward end and a rear end, oriented vertically, and being mounted to said base portion by movable means, so that said vertical deflection bar lies on said vertical diameter, with a portion of said vertical deflection bar extending outward far enough from said base portion to contact said top region of said internal diameter, and wherein said vertical deflection bar is free to move downward when said inspection device encounters a reduction in said vertical diameter of said pipeline;

c. a reflector card, fixedly mounted on said base portion, including a plurality of reflectors;

d. a window card, wherein i. said window card is slidably mounted over said plurality of reflectors on said reflector card;

ii. said window card is attached to said vertical deflection bar so that said window card moves downward when said vertical deflection bar moves downward; and iii. said window card includes a plurality of windows positioned to sequentially expose and occlude said plurality of reflectors in a predetermined sequence as said vertical deflection bar moves downward, thereby indicating to said user the degree of deflection of said vertical test arm.

6. A pipeline inspection device as recited in claim 5, further comprising:

a. a plumb, rotatably mounted to said base portion proximate said rear end, and wherein said plumb is normally oriented vertically; and b. a plumb reflector, affixed to said base proximate said rear end immediately forward of said plumb and sized so that so long as said plumb remains in said vertical orientation, said plumb reflector is not visible to said user.

* * * * *